(12) United States Patent
Gorny et al.

(10) Patent No.: US 10,673,889 B2
(45) Date of Patent: Jun. 2, 2020

(54) SELECTIVE WEBSITE VULNERABILITY AND INFECTION TESTING

(71) Applicant: SiteLock, LLC, Scottsdale, AZ (US)

(72) Inventors: Tomas Gorny, Paradise Valley, AZ (US); Tracy Conrad, Scottsdale, AZ (US); Scott Lovell, Lynnfield, MA (US); Neill E. Feather, Phoenix, AZ (US)

(73) Assignee: SiteLock, LLC, Scottsdale, AZ (US)

( * ) Notice: Subject to any disclaimer, the term of this patent is extended or adjusted under 35 U.S.C. 154(b) by 115 days.

(21) Appl. No.: 15/863,048

(22) Filed: Jan. 5, 2018

(65) Prior Publication Data

US 2018/0262523 A1 Sep. 13, 2018

Related U.S. Application Data

(63) Continuation of application No. 14/953,535, filed on Nov. 30, 2015, now Pat. No. 9,900,337, which is a continuation of application No. 13/186,426, filed on Jul. 19, 2011, now Pat. No. 9,246,932.

(60) Provisional application No. 61/365,402, filed on Jul. 19, 2010.

(51) Int. Cl.
*H04L 29/06* (2006.01)

(52) U.S. Cl.
CPC ........ *H04L 63/1433* (2013.01); *H04L 63/101* (2013.01); *H04L 63/145* (2013.01); *H04L 63/1425* (2013.01); *G06F 2221/2119* (2013.01)

(58) Field of Classification Search
CPC .......... G06F 2221/2119; H04L 63/101; H04L 63/1425; H04L 63/1433; H04L 63/1441–145; H04L 63/1466–1483; H04L 63/20
See application file for complete search history.

(56) References Cited

U.S. PATENT DOCUMENTS

2008/0117917 A1* 5/2008 Balay .................. H04L 63/102
                                                          370/395.21
2012/0174224 A1* 7/2012 Thomas ................ G06F 21/566
                                                          726/24

* cited by examiner

*Primary Examiner* — Kevin Bechtel
(74) *Attorney, Agent, or Firm* — DLA Piper LLP (US)

(57) ABSTRACT

In embodiments of the present invention improved capabilities are described for selective website vulnerability and infection testing and intelligently paced rigorous direct website testing. By providing robust website content integrity checking while only lightly loading the website hosting server, visitor bandwidth availability is maintained through selective testing and intelligently paced external website exercising. A modular pod-based computing architecture of interconnected severs configured with a sharded database facilitates selective website testing and intelligent direct website test pacing while providing scalability to support large numbers of website testing subscribers.

24 Claims, 15 Drawing Sheets

FIG. 9

MESSAGES AND ALERTS ⟵ 1102

MESSAGES AND URGENT ALERTS FROM SITELOCK REGARDING THE SECURITY AND REPUTATION OF YOUR BUSINESS.  [2 UNREAD] [NO CRITICAL] [ALL]

| DATE ▽ | TYPE | SEVERITY | SUBJECT | |
|---|---|---|---|---|
| ▭ TODAY | | | | |
| ✉ 7/7/2011 | SECURITY | NOTICE | NO MALWARE HAS BEEN FOUND ON YOUR S... | ✕ |
| NO MALWARE HAS BEEN FOUND ON YOUR SITE | | | | |
| ✉ 7/7/2011 | SECURITY | NOTICE | NO EMAIL SPAM VULNERABILITIES HAVE ... | ✕ |

SELECTIVE WEBSITE VULNERABILITY AND INFECTION TESTING

CROSS-REFERENCE TO RELATED APPLICATIONS

This application is a continuation of U.S. patent application Ser. No. 14/953,535, filed Nov. 30, 2015 which is a continuation of U.S. patent application Ser. No. 13/186,426, filed Jul. 19, 2011, which claims the benefit of U.S. provisional application Ser. No. 61/365,402, filed Jul. 19, 2010.

Each of the above applications is hereby incorporated by reference in its entirety.

BACKGROUND OF THE INVENTION

Field

The methods and systems of selective website vulnerability and infection testing relates to website malware testing and detection.

Description of the Related Art

Websites are collections of information intended to be viewed, used, and interacted with such as through a web server by exchanging information between a server and a client over a network, such as the Internet. There are a number of commercially available packages that generate the necessary website pages that can be uploaded to web servers connected to the Internet. Any number of defects, infections, vulnerabilities, malware, spam, and the like may be found in website pages on the internet. Therefore, web testing may be done for identifying such defects in a website pages (e.g. before a website is made live). Testing and analysis of websites confirms content and proper operation. For example, testing the website ensures whether all links are working correctly. Further, the website can be tested to be cross browser compatible. Testing of the website determines delivered performance of a website server, analyzes capacity of the website server by imposing realistic loads, and identifies erroneous website pages. Issues such as the security of the website content or data stored in association therewith are also typically checked during testing.

Conventionally, there are several security testing methods that can be used to obtain information about how a website behaves when viewed in a web browser or the like. Examples of such security testing methods may include, but are not limited to, sequel injection testing, phantom web page testing, open source security testing, penetration testing, cross-site scripting (XSS) testing, Carriage Return and Line Feed (CRLF) injection testing, JavaScript injection testing, code execution testing, directory traversal testing, and the like are some of the testing techniques currently available in the market.

However, these conventional testing techniques generate a significant amount of traffic to and require a significant amount of data traffic from a website (an in particular the server(s) that are used to host the website) to test its integrity and to look for hidden web pages, and the like. The significant amount of traffic, generated by the current website testing functionality, takes up a significant amount of website access bandwidth due to generation of tens of thousands of page requests to test for hidden pages on the website that are generally known to be associated with intrusions or malware. The significant amount of access bandwidth may affect or even overload a server that is hosting the website under test. Further, resource and bandwidth efficiency of conventional testing techniques may not be acceptable for the advancing share hosting environments that are common today. They eat up a lot of time of the resource (i.e. hosting server) for the security testing. Often there are redundant page requests for the required pages of the website. All these issues can lead to a significant degradation in the performance of a website.

There has also been a noticeable increase in the existence of small websites. Small websites may be increasing due to a number of factors such consumer demand, ease of website creation tools, low cost for shared web hosting, inexpensive ways of making others aware of a business or brand, affiliating networks that target web traffic to a website to increase profits, and the like. Many easy and inexpensive website generation software packages have also lead to the creation of a plurality of small websites. Web hosting has responded to this significant increase by offering a variety of shared hosting approaches such as offering lower costs hosting fees for websites up to a small number of web pages (e.g., 25). Shared web hosting approach may host multiple websites on a single web server connected to the Internet. Each site may be placed on its own partition on the server to keep it separate from other sites. Shared web hosting keeps costs down as many people share the overall cost of server operation and maintenance. Further, shared web hosting provides affordable web hosting solution for small business.

In a shared hosting environment tens of thousands or even millions of small websites may be hosted by a single web server. This single web server must handle all the traffic for this large number of small websites. However, heavy use of small websites can lead to a significant degradation in performance, or even a complete loss of services of the small websites because the small websites have been hosted by a single web server.

As discussed above, conventional website security testing methods generate a significant amount of traffic towards a website to test its integrity and look for hidden web pages. Since small websites are typically hosted on a shared server, employment of conventional website security testing methods can result in an uncceptable amount of traffic to web pages hosted on the shared server. This may cause the shared server to get overloaded and also lead to a significant degradation in the performance of the small websites, making them unavailable or inaccessible. Achieving a timely, high degree of confidence in the integrity and security of website content while lightly loading web servers, particularly shared hosting servers to enable high availability and superior responsiveness for visitor website access is not simple to achieve and may require rethinking how website testing is conceived, designed, offered for subscription, delivered, and the like.

SUMMARY OF THE INVENTION

In an aspect, the present invention provides a method for selective website vulnerability and infection testing based on an expected site traffic volume and hosting configuration. The method may include accessing website information in a database with a processor. The website information may include at least one of expected site traffic volume and hosting configuration. Further, the method may include configuring an invocation of website vulnerability and infection testing with the processor based on the accessed website information.

In another aspect, the present invention provides a method for pacing website vulnerability and infection testing based on host configuration. The method may include accessing website hosting configuration information with a processor.

The method may further include configuring a schedule of website vulnerability and infection testing based on the hosting configuration information. In an embodiment, the website vulnerability and infection testing may include rigorous direct website testing.

In another aspect, the present invention provides a method for pacing website vulnerability and infection testing based on a communication bandwidth constraint. The method may include accessing hosted website information that may include a communication bandwidth constraint. The method may further include configuring a schedule of website vulnerability and infection testing based on the communication bandwidth constraint.

In still another aspect, the present invention provides a method for selecting between a higher and lower bandwidth consuming vulnerability and infection test procedures based on an expected site traffic volume and hosting configuration. The method may include accessing website information in a database with a processor. The website information may include at least one of the expected site traffic volume and the hosting configuration. Further, the method may include selecting between the higher and lower bandwidth consuming vulnerability and infection test procedures with the processor based on the accessed website information.

In yet another aspect, the present invention provides a method for selecting a subset of website pages to test for vulnerabilities and infection based on a maximum permissible number of website pages allowed for testing. The subset of the plurality of website pages may be hosted by a shared hosting provider. In an embodiment, a first website may be commonly hosted with a second website. The method may include determining with a processor a maximum permissible number of website pages allowed for testing based on a subscriber profile. The maximum permissible number of website pages allowed for testing may not be exceeding twenty-five pages. Further, the method may include accessing links accessible to a plurality of website pages on the first website page.

Additionally, the method may include analyzing the accessed links to determine the subset of the plurality of website pages for vulnerability and infection testing based at least in part on the determined maximum permissible number of website pages. Further, analysis of links to the website pages may include an infection status of a webpage that may be identified by a link, an analysis of historical data of the link, a length of URL associated with the link, similarity of the links, an analysis of a location of a link on a website page, and the like.

Further, the present invention provides a method for selecting a subset of website pages to test for vulnerabilities and infection based on an analysis of links to the website pages. The method may include accessing links on a first website page. The links may facilitate access to a plurality of website pages. The method may also include analyzing the accessed links to determine a subset of the plurality of website pages for vulnerability and infection testing. The vulnerability and infection testing may be based at least in part on a result of the analysis. In embodiments, if the result of the analysis is indicative of a link being malware, the page may be flagged from which the link may be accessed as containing malware. Further, the analysis may include an infection status of a webpage identified by a link, an analysis of historical data of the link, a length of URL associated with the link, similarity of the links, a location of a link on a website page, and the like.

In still another aspect, the present invention provides a method for selecting a subset of website pages to test for vulnerabilities and infection based on website page infection status. The method may include accessing links on a first website page. The links may facilitate access to a plurality of website pages. The method may further include determining prior vulnerability and infection testing results for each page of the plurality of website pages. The method may also include a link to the website page in the subset of website pages to test for vulnerability and infection, based on the results that may indicate prior vulnerability or infection.

In yet another aspect, the present invention provides a method for selecting a subset of website pages to test for vulnerabilities and infection based on a website hosting environment. The subset of pages of the website may be hosted by a shared hosting provider. Further, the subset of pages of a first website may be commonly hosted with a second website. The method may include accessing website hosting configuration information with a processor. Further, the method may include selecting a subset of pages of the website for vulnerability and infection testing based on the hosting configuration information.

In still another aspect, the present invention provides a method for selecting a subset of website pages to test for vulnerabilities and infection based on a test client signup channel. The method may include accessing website security testing subscriber information with a processor. The subscriber information may facilitate identifying a signup channel which may be one of a shared hosting partner, an organic signup of the subscriber, and the like. The method may further include selecting a subset of pages of the website for vulnerability and infection testing based on the signup channel. The subset of pages of the website may be hosted by a shared hosting provider. Further, the subset of pages of a first website may be commonly hosted with a second website In yet another aspect, the present invention provides a method for selecting a subset of website pages to test for vulnerabilities and infection based on a measure of proximity to a website home page. The method may include accessing links on a plurality of website pages. Further, a portion of links may facilitate access to other pages in the website. The method also includes determining a length of each of the portion of links. Further, the method may include selecting a subset of the portion of links, based on the determined length. The subset may be selected to satisfy a requirement that pages that may be accessible through shorter length links may be included in the subset.

In still another aspect, the present invention provides a method for selecting a pacing of direct website page testing based on a maximum permissible number of website pages allowed for testing. The method may include determining with a processor a maximum permissible number of website pages allowed for testing based on a subscriber profile. In an embodiment, the maximum permissible number of website pages allowed for testing may not exceed twenty-five pages. Further the method may include configuring a schedule of pacing of direct website page testing based on the determined maximum permissible number of website pages.

In yet another aspect, the present invention provides a method for selecting a pacing of direct website page testing based on website page infection status. The method may include determining with a processor a status of prior infection of at least one website page. The method may include configuring a schedule of pacing of direct website page testing of a website. The website may include the at least one website page based on the status of prior infection.

In still another aspect, the present invention provides a method for selecting a pacing of direct website page testing based on a website hosting environment. The method may include accessing hosting configuration information of a website with a processor. The website hosting configuration information may indicate that the website is hosted by a shared hosting provider. Further, the method may include configuring a schedule of pacing of direct website page testing based on the hosting configuration information.

In yet another aspect, the present invention provides a method for selecting a pacing of direct website page testing based on a test client signup channel. The method may include accessing website security testing subscriber information with a processor. The subscriber information may facilitate identifying a signup channel of the subscriber. Further, the method may include configuring a schedule of pacing of direct web site page testing based on the signup channel.

In still another aspect, the present invention provides a method for determining a malware likelihood of a website page link based on link occurrence analytics. The method may include aggregating counts of occurrences of links across a plurality of web sites. The method may further include taking a malware likelihood occurrence threshold. The method may include determining a malware likelihood of a link based on a comparison of a count of occurrences of the link and the malware likelihood occurrence threshold. In an embodiment, determination of the malware likelihood of a website page link based on link occurrence analytics may include aggregating links across a plurality of web sites, comparing a count of occurrences of a link to a link-malware threshold, comparing a count of web sites on which the link occurs to a link-malware threshold, aggregating links across a plurality of infected web sites. In an embodiment, the link-malware threshold may be derived from a baseline link-malware threshold. Further, the link-malware threshold may be lower than the baseline link-malware threshold.

In yet another aspect, the present invention provides a method for classifying a website page link as malware based on link occurrence analytics. The method may include aggregating counts of occurrences of links across a plurality of web sites. The method may include taking a malware occurrence threshold. Further, the method may include comparing an aggregated count of occurrences of a link to the malware occurrence threshold. The method may also include classifying the link as malware if the comparison indicates the aggregated count of occurrences exceeds the malware occurrence threshold.

In still another aspect, the present invention provides a scalable pod-based computing architecture for selective website vulnerability and infection testing system. The system may include a multi-subscriber pod. The multi-subscriber pod may include a plurality of scan servers for scanning a selective subset of pages of a website. The multi-subscriber pod may also include at least one direct test server for rigorously testing websites based on an intelligent pacing schedule. Further, the multi-subscriber pod may include a sharded database for storing subscriber website test related information. Furthermore, the multi-subscriber pod may include a scheduler for facilitating the plurality of scan servers, at least one direct test server, and the sharded database performing selective website vulnerability and infection testing. In an embodiment, the system may be scalable by configuring a plurality of multi-subscriber pods to work cooperatively to selectively test websites for vulnerability and infection.

These and other systems, methods, objects, features, and advantages of the present invention will be apparent to those skilled in the art from the following detailed description of the preferred embodiment and the drawings. All documents mentioned herein are hereby incorporated in their entirety by reference.

BRIEF DESCRIPTION OF THE FIGURES

The invention and the following detailed description of certain embodiments thereof may be understood by reference to the following figures:

FIG. 9 depicts a snapshot of a dashboard of a website's scanning service;

FIG. 11 depicts a snapshot displaying messages and alerts section from the website(s) scanning service regarding security issues;

FIG. 13 depicts a screen shot of the website scanning service for selecting the issues related to malware for which users are seeking expert services;

FIG. 15 depicts a screen shot of a malware scan pop-out report.

DETAILED DESCRIPTION OF THE PREFERRED EMBODIMENT(S)

Methods and systems of website scanning and security testing may include selective website vulnerability and infection testing that may be based on an expected site traffic volume and/or hosting configuration. Ensuring that websites are tested without unduly burdening a hosting system with significant bandwidth load strictly for achieving website testing may be economically and effectively accomplished through selective website vulnerability and infection testing. Such testing may take into account an expected site traffic for non-testing access (e.g. website visitors, site maintenance, data in/out of the website server storage, and the like) and expected site traffic for testing access and may selectively determine a level of access (e.g. number of website pages, rate of access over short and/or long periods of time, and the like) for website vulnerability and infection testing to ensure safe and reliable website content. Because the undesirable introduction of malware is an ever present condition, regular and frequent website vulnerability and infection testing may be critical to maintaining the security and safety of websites. Given this important consideration and the desirability of shared website hosting services, selective website scanning and security testing may also take in to account a hosting environment as a consideration in a design or performance criteria for such a website testing service.

In addition to regular and frequent (e.g. daily) website content scanning, vulnerability and infection testing may include rigorous direct website testing. Such testing can place a substantive bandwidth demand on the servers and databases associated with websites. Although such testing that may be delivered to satisfy a testing provider criteria (e.g. lowest cost, etc) may be suitable for dedicated web hosting environments, pacing of website vulnerability and infection testing that includes rigorous direct website testing may achieve a balance of comprehensive website testing coverage and moderate website hosting server bandwidth loading. Therefore, methods and systems of website testing may include pacing website vulnerability and infection testing based on a communication bandwidth constraint.

Figure 1:
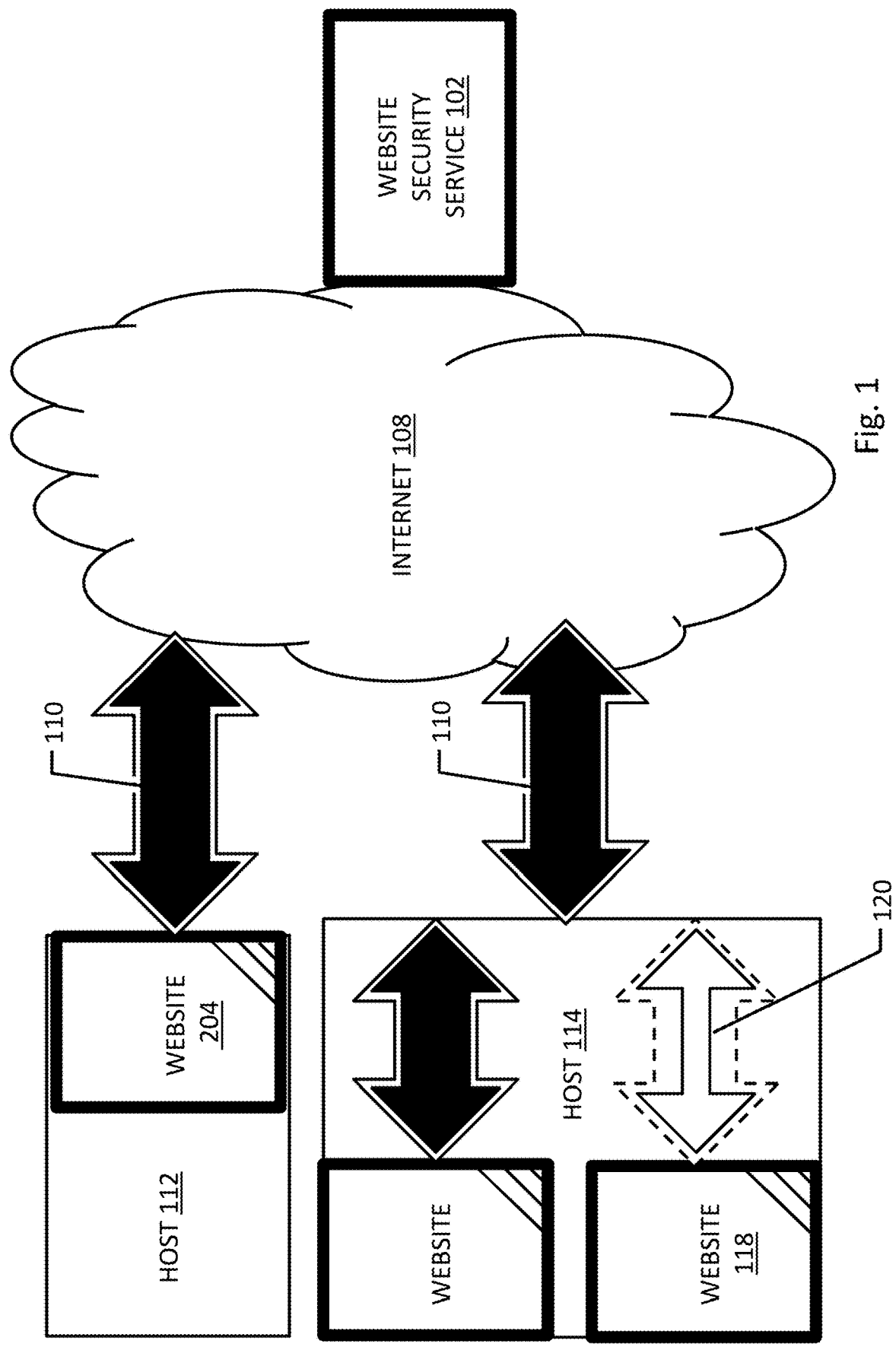
FIG. 1 depicts an embodiment of rigorous direct website testing of websites.

FIG. 1 depicts an embodiment of rigorous direct website testing of websites. Such testing as depicted in FIG. 1 may include one or more website security service(s) 102 accessing a plurality of websites 104 through the a network such as the internet 108. As depicted in FIG. 1, the demands on testing access bandwidth 110 may leave relatively little bandwidth for non-testing uses. Although such bandwidth utilization for testing may be somewhat undesirable for supporting visitor access contemporaneously with website testing, for dedicated hosting environments 112 the bandwidth demand only impacts the specific website being testing. For shared hosting environments 114, the demand may cause other commonly hosted websites 118 to not be able to respond to even visitor traffic in a timely way, effectively reducing the available visitor bandwidth 120 for such commonly hosted sites.

Figure 2:
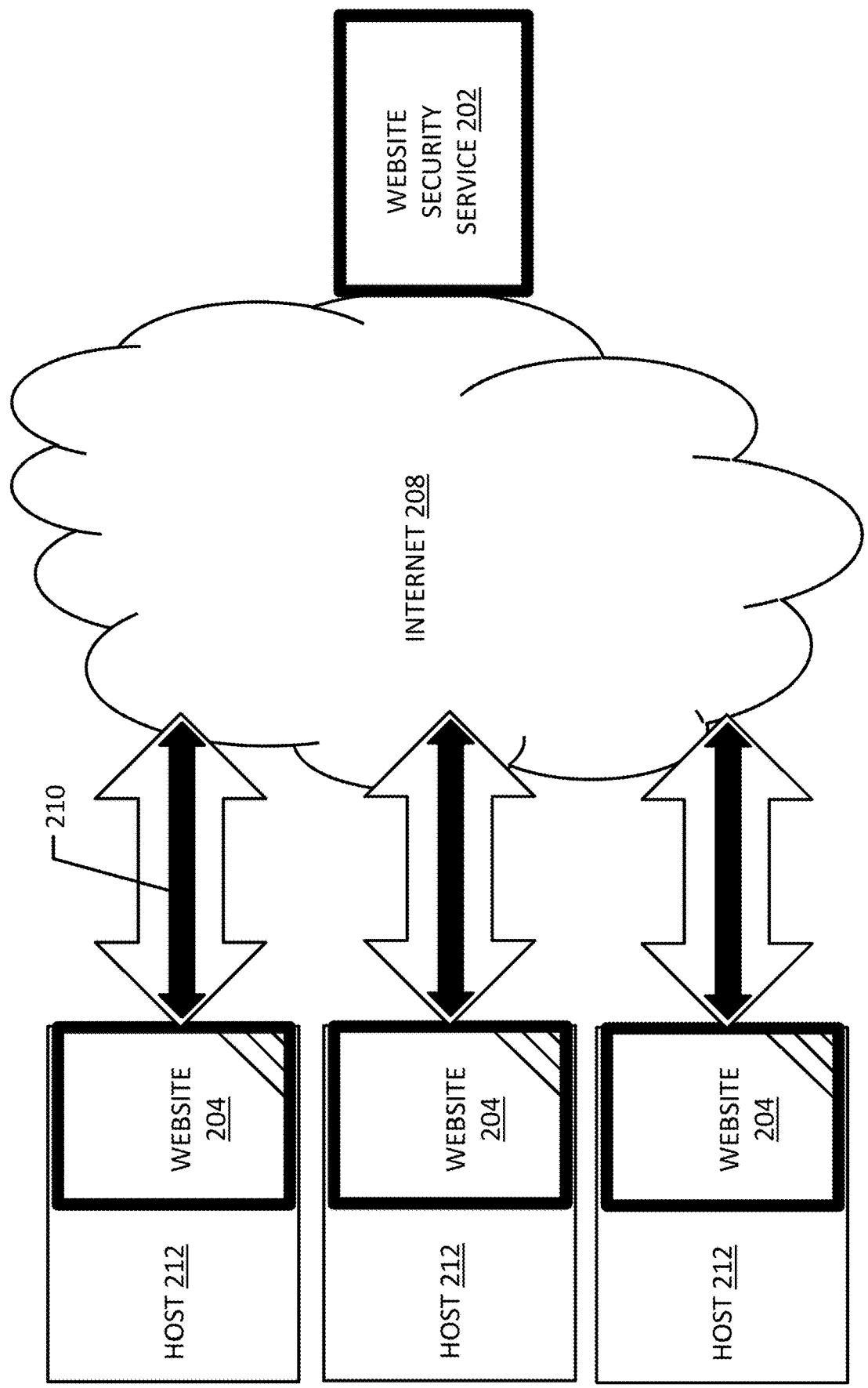
FIG. 2 depicts an embodiment of an intelligently paced selective website vulnerability and infection testing.

FIG. 2 depicts an embodiment of an intelligently paced selective website vulnerability and infection testing that may include rigorous direct website testing of dedicated hosted websites. Such testing as depicted in FIG. 2 may include one or more website security service(s) 202 accessing a plurality of websites 204 through the a network such as the internet 208. As depicted in FIG. 2, the demands on testing access bandwidth 210 may leave a significant portion of available bandwidth for non-testing uses. Although such bandwidth utilization for testing may be very desirable for supporting visitor access contemporaneously with website testing, for dedicated hosting environments 112 the bandwidth demand only impacts the specific website being testing. As depicted in FIG. 2, not only does each dedicated host 202 enjoy lower utilization, but visitor access is enhanced using selective website vulnerability and infection testing that includes intelligently paced rigorous direct website testing.

Figure 3:
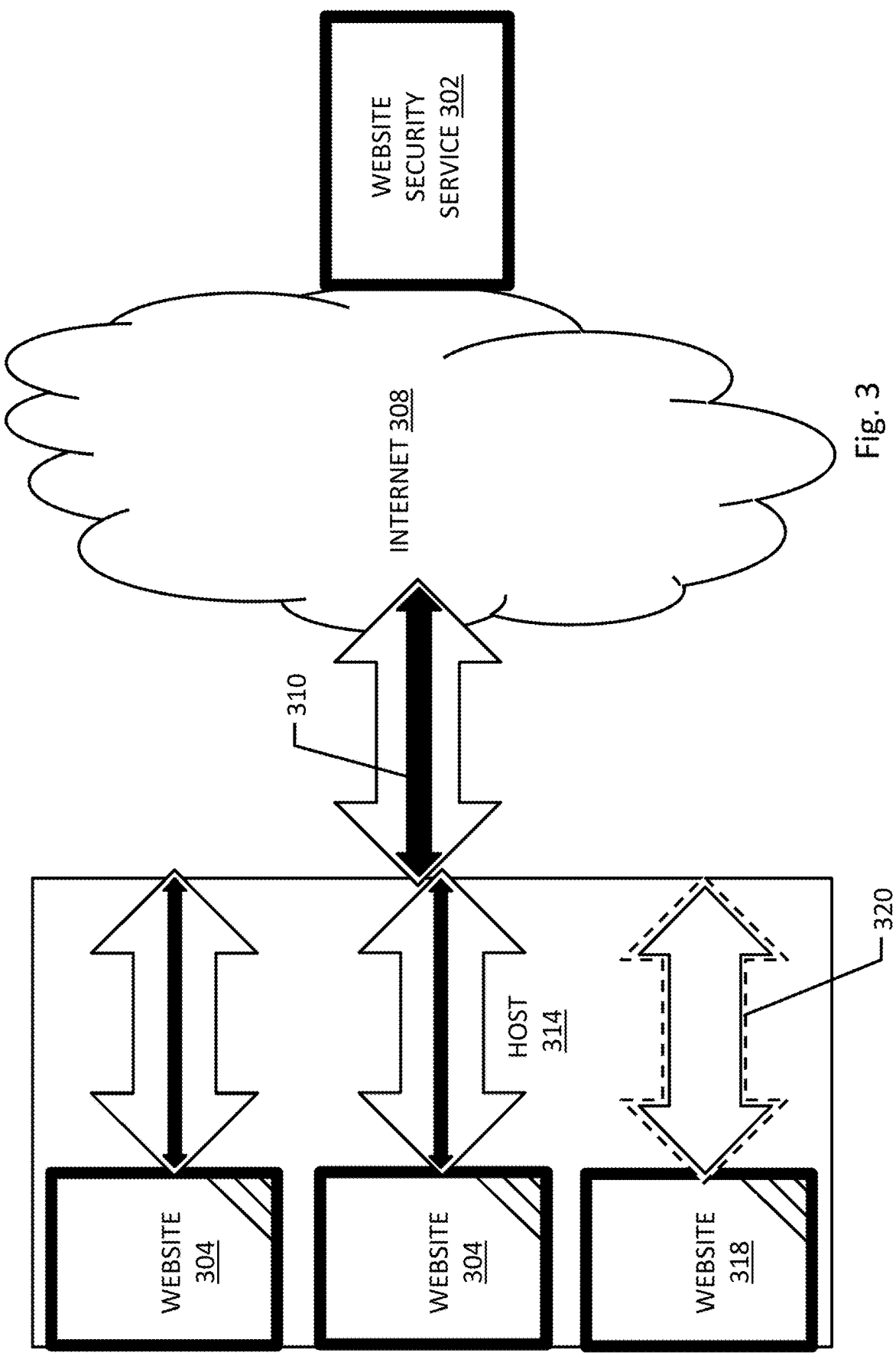
FIG. 3 depicts an embodiment of an intelligently paced selective website vulnerability and infection testing.

FIG. 3 depicts an embodiment of an intelligently paced selective website vulnerability and infection testing that may include rigorous direct website testing of commonly hosted websites. Such testing as depicted in FIG. 3 may include one or more website security service(s) 302 accessing a plurality of websites 304 through the a network such as the internet 308. As depicted in FIG. 3, the demands on testing access bandwidth 310 may leave a significant portion of available bandwidth for non-testing uses. Although such bandwidth utilization for testing may be very desirable for supporting visitor access contemporaneously with website testing, for shared hosting environments 314 the bandwidth demand only slightly impacts other commonly hosted websites 318, thereby leaving effectively nearly all of the available bandwidth 320 through the shared hosting architecture for the other websites 318 for visitor access. As depicted in FIG. 3, not only is visitor access enhanced using selective website vulnerability and infection testing that includes intelligently paced rigorous direct website testing, but each shared host 314 enjoys lower utilization.

The methods and systems of website vulnerability and infection testing may further include selecting between a higher and lower bandwidth consuming vulnerability and infection test procedures based on an expected site traffic volume and hosting configuration. Such selection between higher and lower bandwidth consumption and/or selecting either higher or lower bandwidth consumption vulnerability and infection testing may facilitate conducting the type of testing that is most appropriate at any invocation of such testing. If, for example, server loading of a shared website hosting environment is found to be below a bandwidth utilization threshold, and or the bandwidth consumption of visitor and/or other non-testing access of a website is below a threshold, pacing of vulnerability and infection testing may favor higher bandwidth consumption so long as the bandwidth consumed results in the server loading to exceed a similar threshold. In this way, high bandwidth consuming tests may be conducted based on expected site traffic volume and/or hosting configuration.

As noted above, the methods and systems of website scanning and security testing described herein may include selective website vulnerability and infection scanning that may take into consideration site testing traffic volume and/or hosting configuration. Such selective website testing may include limiting the number of web pages scanned for each website, such as to satisfy a contractual agreement (e.g. a subscription), while ensuring that robust coverage of web pages that are most readily accessed through links that are found a website home page. Selective website vulnerability and infection testing may be conducted by scanning website pages for links that cause a malware-type action (e.g. improperly redirecting the website visitor's browser). To ensure that website content is substantially free of malware and infections given a limited number of pages to be checked, website pages may be selectively scanned periodically (e.g. each day). Scanning website content may include analyzing the content to identify links (e.g. URLs) within the content as links may be a readily injected source of infection even for web pages that do not contain active content (e.g. javascripting, etc)

Selective website scanning and security testing may therefore primarily focus on analyzing the information that is found on the website pages. In this way, website content is robustly validated with a very light bandwidth demand on the website hosting server(s). Providing robust website security and infection testing while taking the equivalent of a small sip of the available website host bandwidth may be an important benefit of the selective website scanning and security testing methods and systems described herein.

Selective website scanning may include accessing a website homepage and capturing all links on that page for analysis (e.g. dynamic analysis as the links are captures and/or contemporaneous analysis once links from the page are captured). The links may be compared to a link analysis dataset that may include whitelisted links (good, safe links) and blacklisted links (malware or highly likely to be malware). Each link and he disposition of comparison may be saved to a database that is accessible to servers that execute the various selective website security testing software.

A selective website scanning process may further include traversing links found in the home page and/or accessing website pages that have been previously determined (e.g.

through a website spidering process, through security client website map data input, and the like) to analyze the content to find and analyze links found on the additional website pages. In the event that a website contains more pages than the subscriber for that website has subscribed to be analyzed with a selective website scanning process, certain decisions are made during the website scanning process regarding which pages to scan and in which order. Such decisions may be important for security reasons, business reasons, customer relationship reasons, technical reasons, and the like.

Webpage selection for selective website scanning may include the following decision points/criteria. When scanning a website, any pages that were previously scanned and determined to include an infection or vulnerability (e.g. malware link) will be included in the current scan. Generally if a website page has been determined to be infected, it is scanned on each subsequent scan invocation for a minimum number of invocations. If scan invocation is daily, an infected page will be scanned each day for at least thirty days after the infection is detected. Scanning pages that have had recent infection/malware on them may be prudent because some vulnerability may be present in the page/site that can be exercised again by an intruder. The inventive selective website scanning system described herein may alert a user to an infection, yet the resolution of any vulnerability may take an extended amount of time for completion.

An additional criteria for determining which webpage to scan is based on whether the webpage is 'found' during the current scanning invocation or if it was previously known. In particular one such criteria is pages that are linked directly from a current page being scanned. If a link to a page is present on a current page, such a page may be prioritized for scanning over another page that is known to exist in the website map or was detected on a previous scan invocation but is not linked from the current page (e.g. not linked from the home page).

Another criteria for determining which webpages to scan may be the formation of the link to the webpage. Websites may include articles and other generated webpages that are indicated as a parameter (variable) of a link string, such as "index.php?x" or the like. Rather than testing every iteration of the variable "x", the integrity of the link is verified through a subset of variable values, such as a single value. Consequently, applying additional values to the link, to generate additional web pages, is deferred until other types of web pages are scanned. If all other higher priority web pages are scanned and the page scan limit for the current subscription has not yet been reached, additional variables may be applied and the resulting page(s) may be scanned.

Yet another criteria for determining which web pages and the relative order of web pages to scan is the length of the URL for the page. As URLs for webpages in a website are generally based off of a base which is typically where a home page is located, web pages with shorter URLs tend to be closer to the home page. This closeness may indicate that the web pages are more likely to be accessed through the home page or at least more often than web pages that have longer URLs and are therefor farther away from the home page. Hackers and others who insert malware and malware-like redirecting links on pages tend to target pages that are more frequently accessed and/or are more likely to be accessed, which is generally pages closer to the home page with regard to the URL length.

A selective website security and vulnerability scanning process as described herein may process links found on scanned pages as described above to determine web pages to scan. Once the criteria above have generally been exhausted for a website and the scan page limit based on the subscription has not yet been reached, all remaining links from all pages will be evaluated using substantially the same criteria above to determine which additional web pages should be scanned.

Although the number of webpages to be scanned are generally described as being limited by a subscription to a selective website scanning service, other limits, such as a limit on the number of links on a page may also be imposed as part of a subscription. Alternatively, although every link may be scanned during a selective scanning process, the number of links that may be stored (e.g. noting the status of each link) may be limited.

An invocation of a selective website vulnerability and infection scanning process may include analyzing web page content in addition to links found on the pages. Web page content analysis may include flash decoding (e.g. to extract links that may be visible to a user viewing the flash generated web page); javascript execution (e.g. to extract links or other vulnerabilities that may not be visible to a user viewing a webpage containing the javascript); link location analysis (e.g. links that appear after the apparent bottom of a webpage—after an html closing tag </html>, or links that appear in bulletin board content are rather highly likely to be some sort of spam or malware); malware signature detection (e.g. industry known malware signatures and/or signatures generated by an analysis facility described elsewhere herein with respect to content captured while selectively scanning websites); quantity of links of certain types (e.g. if a page has twenty-five or more links of the form "<a>href="someword">someword</a>" and the string "someword" is not one of a set of common strings that are know to be safe strings including about, video, contact, help, register, and the like; multiple occurrences of spam words (e.g. using a severity indexed dictionary of spam words, detecting fifteen or more occurrences of a spam word of severity 1, thirty or more occurrences of a spam word of severity 2, or fifty or more occurrences of any combination of spam words).

Other types of webpage content checking that may be included in a selective website vulnerability and infection scanning invocation may include checking fields of webpage forms, checking binary files that are linked from a scanned webpage, domain name checking (e.g. against spam lists), scripting that may result in cross-site execution and/or access, and the like.

Figure 4:
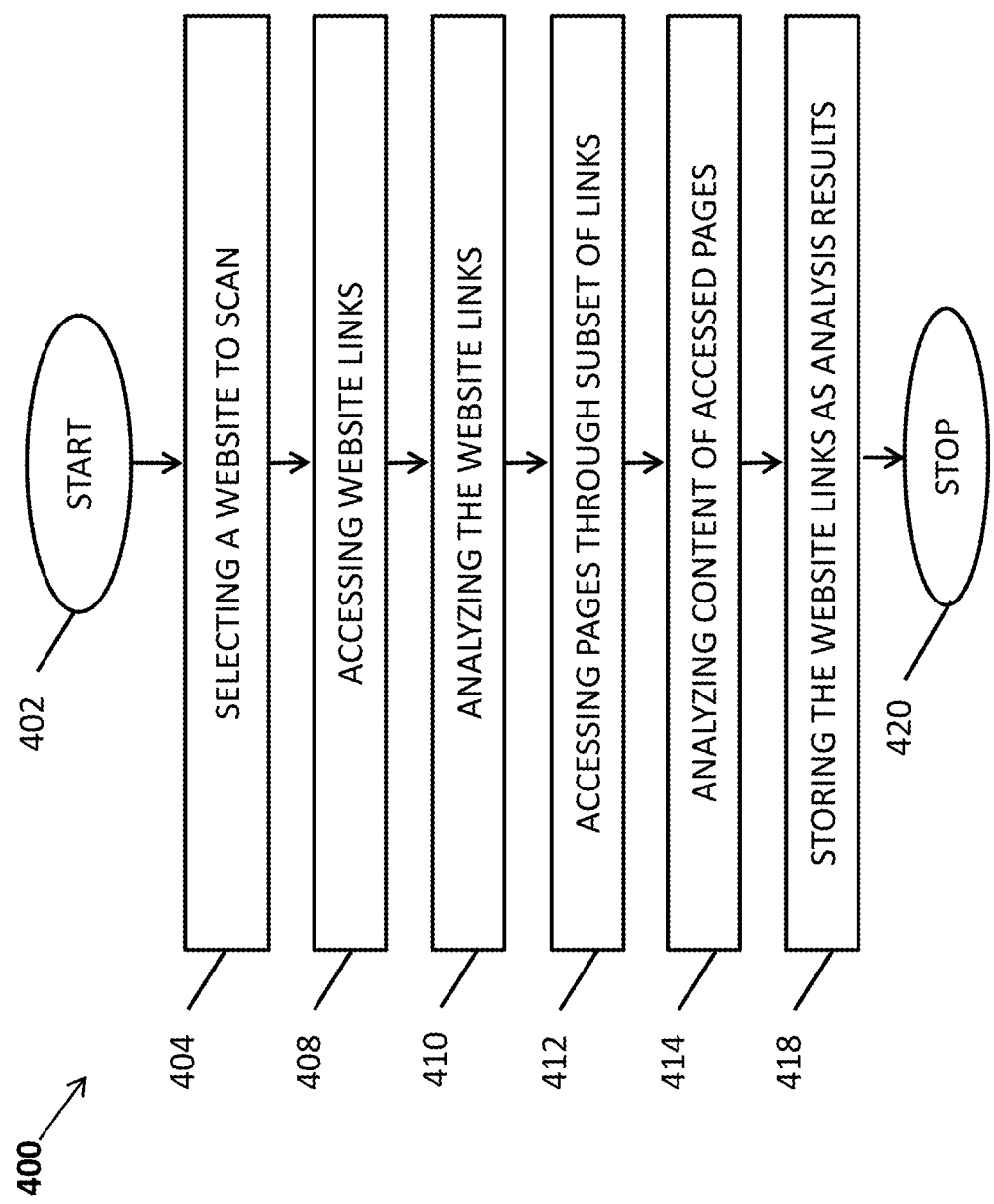
FIG. 4 depicts a flowchart for selective website based daily scanning.

The methods and systems of selective website vulnerability and infection testing may be configured as a sequence of steps as shown in the embodiment of FIG. 4 which depicts a flowchart for a method 400 for selective website based daily scanning. The method 400 starts at step 402. At step 404, a website may be selected for scanning. Thereafter, at step 408, links to the website may be accessed. The links may then be analyzed at step 410. At step 412, the links may be used for accessing different web pages through subsets of the links. Further, content of the accessed web pages may be analyzed at step 414. As a result of the analysis, website links may be stored at step 418. The method 400 terminates at step 420.

A selective website vulnerability and infection scanning process may include selection of scan functionality that is client directed. For example, a client may subscribe to a basic scanning plan, but may opt for certain additional functionality, thereby taking advantage of the cost management features of such a system while ensuring key safety and security aspect of the client's website is covered. One such client direction may be to increase a number of pages to be scanned with each scan invocation; another may be a frequency of certain scanning invocations, and the like.

As links are captured by the selective website vulnerability/infection scanning process described herein, the links are stored in a database to facilitate post processing of the links for additional security analysis that facilitates continuous improvement in website vulnerability/infection/spam scanning. Post processing of captured links facilitates determining the occurrence-based popularity of new links that have not previously been detected through selective website scanning and/or learned from third party link quality database information. Link post processing provides a vehicle for assessing new links based on the scanning of all subscriber websites since the last post processing invocation (e.g. each day post processing may be invoked to process the links captured by the selective scanning process in the past twenty-four hours). An objective of link post processing may be to determine if each new link found in the selective scanning is a white list (safe, good), black list (malware, spam), or below risk threshold (neither black or white list).

A link post process method may include aggregating the links captured in a selective scan invocation to determine the count of occurrences for each link. Based on the count of occurrences, the unique links may be ordered. Each unique link may then be compared to the current white list and any that match may be marked as good or otherwise eliminated from further processing. The white list and black list may be the same list that was used in the selective website scanning invocation so any links that match to either the white list or the black list have already been flagged when captured, thereby reducing the amount of processing required on previously known (good or bad) links. Links that are neither good nor bad may be analyzed further.

For links that are not already identifiable as either a white list or a black list link (new links), the count of occurrence of such links and/or a count of the number of websites from which such links were captured can be used to determine if the links pose a potential threat as malware or spam. One technique for making an initial determination is to determine if these new links are found on several websites. Generally malware links are propagated to many websites very quickly, so if a new link shows up on several websites (e.g. for or five websites), there is a reasonable likelihood that it should be placed on the black list. Also, if the number of occurrences of the new link is above a threshold (e.g fifty occurrences) there is a reasonable likelihood that is should be placed on the black list. Such links may be compared to any of a variety of third-party white/black lists for additional verification of the safety of the link. Therefore, if a new link is captured from several websites and/or it occurs more than a predetermined number of times, it may be further processed to determine if it is a white list or black list candidate. Such further processing may include the comparing to updated/revised/alternate third-party white/black lists. It may also or alternatively include computer assisted human review of the link. As an objective of link post processing is to unambiguously associate each new link that exceeds at least one of the thresholds described herein with either a white list or a black list.

Each new link is processed in this way to update black and white lists for use in the next invocation of selective website scanning. New links that do not exceed the thresholds noted here for white/black list determination, may simply be marked as unknown at the time of the link post processing. This may happen when a link (good or bad) is lightly used on websites included in the selective scanning invocation. Such links may simply have so few occurrences that a determination is not possible and/or not practical. Because thresholds for link occurrence and website occurrence are low, only a few of the new links may be classified as unknown.

Links that have been captured from webpages that have been flagged as containing malware, either during the current selective scan invocation or during a recently completed selective scan invocation are separately aggregated, sorted, and processed in a similar manner as the link post processing process described herein. Accepting the premise that web pages with malware are much more likely to include additional malware occurrences (e.g. links) than are webpages that do not have or that have not recently had malware, a lower threshold for link occurrence and count of websites containing the link may be used. By focusing on pages with known malware presence (present or recent past) and using lower thresholds, new links that may fall below the general threshold for classifying as white or black listing as described above may be classified here to further improve the objective of unambiguously classifying each new link as a white list link or a black list link.

Post processing of data captured from websites during a selective website vulnerability scan may include generating malware signatures. Such signatures may be determined based on characteristics of the links, placement of links on a webpage, count of links, type of links, other characteristics and/or attributes, and the like. Signatures may include a variety of malware embodiments, some of which include: spam words, end links, shell scripting attacks, content found after a closing </html> tag, and the like. Malware signatures may then be stored in a database for use in subsequent selective website vulnerability/infection/malware/spam scanning.

Black lists, white lists, and malware signatures, among other datasets that may be useful for selective website scanning may include third-party data, such as malware links identified by GOOGLE, YAHOO!, PHISHTANK, and the like.

Figure 5:
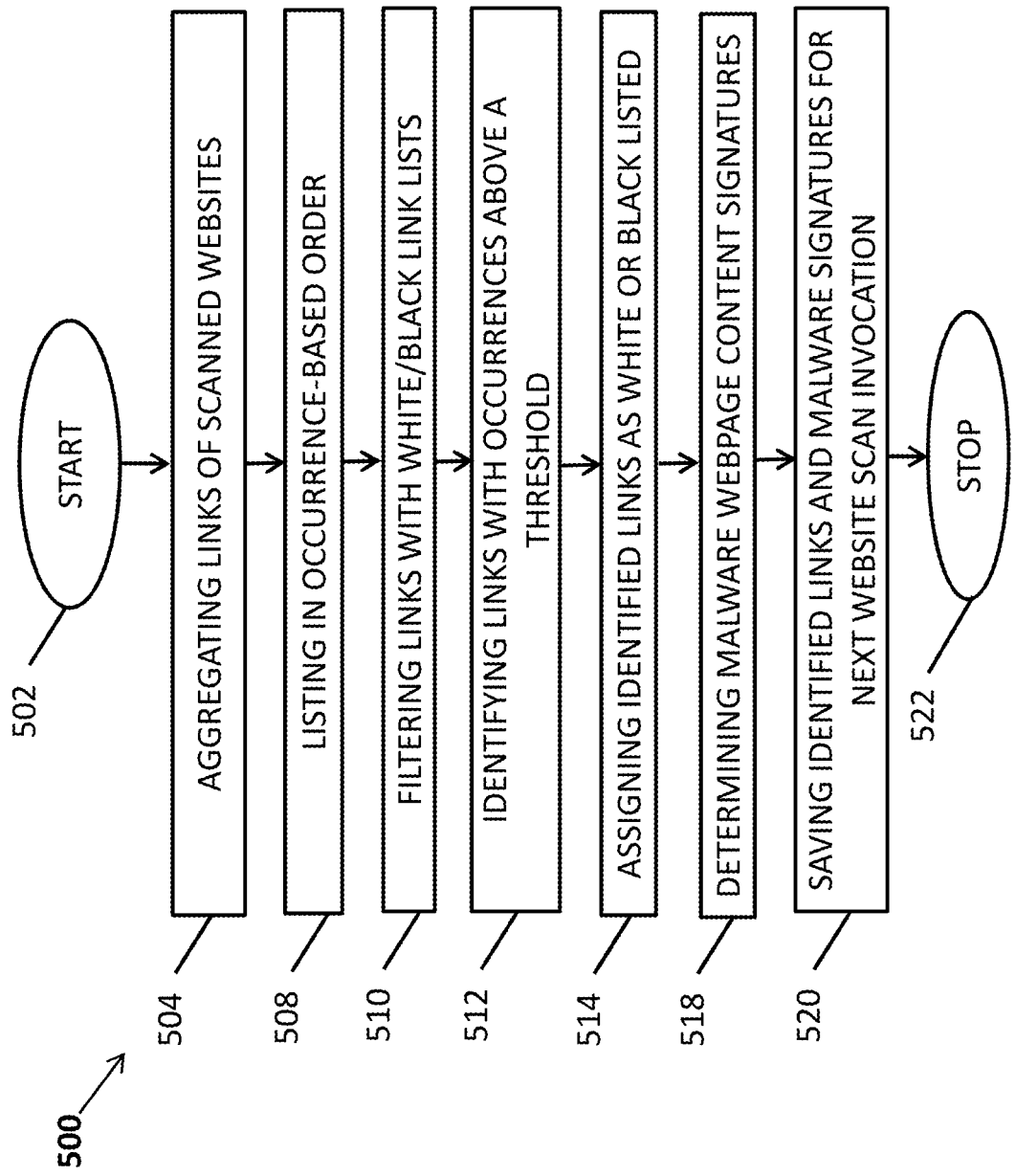
FIG. 5 depicts a flowchart for backend link aggregation.

Post processing of data captured from websites during a selective website vulnerability scan may be configured as a sequence of steps as shown in FIG. 5 which depicts a flowchart for a method 500 for post processing of links, such as backend link aggregation. The method 500 starts at step 502. At step 504, links of various scanned websites may be aggregated. These aggregated links may be listed in order of their aggregated occurrence, at step 508. Thereafter, at step 510, the list of links may be filtered by comparing links to white/black link lists. Further, at step 512, links that may have passed through the filter in step 510 and that may have occurrence counts above a threshold value may be identified. These identified links may be assigned as white or black listed at step 514. At step 518, malware web page content signatures may be identified. These identified links and/or malware signatures may be saved for next website scan invocation, at step 520. The method 500 terminates at step 522.

In addition to selective website vulnerability and infection scanning, the methods and systems described herein may include intelligent pacing of direct testing of websites for a variety of known vulnerabilities, intrusions, and the like. Intelligent pacing may provide significant benefits while ensuring that rigorous direct website testing may be applied to subscriber websites. Such benefits include rigorous direct website testing that only presents a light bandwidth demand to the servers and hosting providers that support website scanning and testing of security system subscribers. By requiring little demand for website access bandwidth, access to the website may be left substantially available for other users, thereby enabling improved response time to request to access the website during rigorous direct website testing. Associated benefits may be provided to web hosting systems that provide web hosting services to security scanning subscriber websites. These associate benefits may be a lower demand on web hosting servers and networks that host thousands (or greater) of subscriber websites. Additional benefits of intelligent pacing include providing such rigorous direct website testing at very low costs to subscribers. Such additional benefits may be of significant value to the millions of owners of small websites who might not have the web management infrastructure and/or staffing to provide website testing and integrity and find the more costly website testing services unacceptable in price.

Intelligent pacing of rigorous direct website testing may provide intelligently paced testing of applications, SQL injection, XSS checking, pseudo-random pagenames, .htaccess redirection of access from specific referral sources (e.g. from search engines), ftp file download and checking, and the like. Pacing may be based on subscription level. A low subscription level (low monthly cost) may include rigorous direct website testing at least once after a minimum numbers of days since signup for the service. In an example, intelligent pacing may include determining a duration of time since signup (or other event such as website creation, etc) and ensuring that testing is paced to occur only after a predetermined duration of time (e.g. 80 days) is detected. Intelligent rigorous direct website testing pacing may be configured differently for higher subscription levels. A higher subscription level may include pacing between rigorous direct website testing. In an example, testing may be paced such that a second invocation of rigorous direct website testing does not begin until thirty days after a first invocation occurred.

Intelligent pacing of rigorous direct website testing may be applied to an invocation of such testing on a website-specific basis. Intelligent pacing during invocation may include performing such rigorous direct website testing on a subset of web pages for a website within a fixed period of time. This type of pacing may limit the number of pages of a specific website that are tested each day to achieve a light access bandwidth load. In an example, SQL injection tests (a common and effective rigorous direct website test) may be limited to 2% of the total website pages to be tested based on the subscription page total. For subscriptions of websites with a large number of pages, this will distribute the testing over several days while ensuring good coverage of the webpages. For subscription websites with a smaller number of pages (e.g. 25 pages), a minimum number of pages tested each day may be factored into the intelligent pacing to facilitate timely completion of direct website testing. In an example a minimum number of pages to be tested each day for SQL injection problems may be five pages. In this way, rigorous direct website testing can be applied to small and large websites alike while ensuring prompt, comprehensive coverage without heavily loading a website's server bandwidth on any given testing day.

Intelligent pacing of rigorous direct website testing may also include ensuring that pages in which problems are detected are retested on a regular basis until the problem is resolved. This provides benefits to the website owner such as confirmation that a direct website testing problem has been properly fixed soon after a fix has been implemented rather than having to wait for a next testing invocation (e.g. 30 days) or having to request a retest of the webpage. In an example, retesting of a webpage with a known test failure may be performed once or more every day until the test failure is no longer detected when rigorously direct website testing the webpage.

Intelligent pacing of rigorous direct website testing may also be based on aspects of the specific direct website test being performed. Continuing with the example of SQL injection testing, SQL injection is often performed on pages that include dynamic CGI that generate a variety of pages based on variables presented to the dynamic CGI function. While SQL injection may be applied to every page that is generated by the dynamic CGI function, intelligent pacing may target SQL injection testing of the page with the dynamic CGI function rather than all of the pages generated through the dynamic CGI function. Such intelligent pacing further facilitates achieving robust direct website test coverage while lightening the bandwidth drain on the website's server(s).

Figure 6:
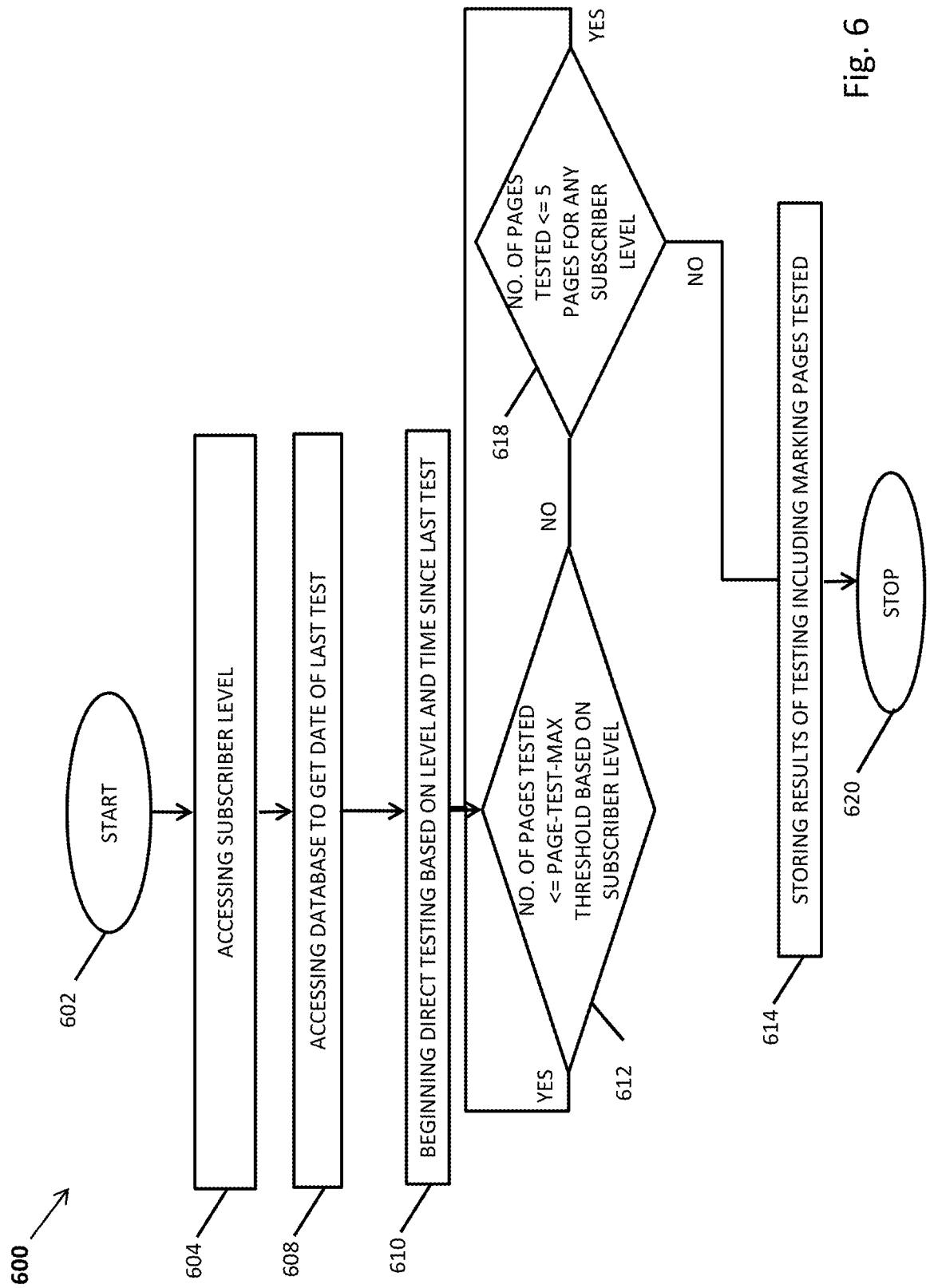
FIG. 6 depicts a flowchart for paced rigorous direct website testing.

Intelligently paced rigorous direct website testing may be configured as a sequence of steps as depicted in FIG. 6 that shows a flowchart for a method 600 for paced rigorous direct website testing. The method 600 starts at step 602. At step 604, a subscriber level may be accessed. Thereafter, at step 608, a database may be accessed to get at least a date of last test. On accessing the database, direct testing may be begun at step 610. The direct testing may be based on level and time since last test. At step 612, the number of pages tested may be compared with page-test-max threshold based on the subscriber level. If the number of pages tested is greater than the page-test-max threshold, the method 600 moves to step 618. If the number of pages tested is less than or equal to the page-test-max threshold testing continues. The results may include marking tested pages. At step 618, if the number of pages tested is less than or equal to five pages for any subscriber level, testing continues. However, if the number of pages tested is not less than or equal to five pages for any subscriber level, the flow moves to step 614 for storing the results of testing. The method 600 continues from step 614 to terminate at step 620.

In addition to website directed scanning and testing, the methods and systems described herein may include web hosting server port scanning. Although web hosting server port scanning may directly benefit a web hosting provider, ensuring that the ports of a server that hosts a website do not have known vulnerabilities can benefit the website as well, such as by ensuring that all open ports that may provide an access path to infect or inject spam or malware into the website have been checked in addition to a website being checked. Server port scanning may be intelligently paced at least in that it may be conducted on a somewhat fixed schedule for each server. When a subscriber website is selectively scanned, a status of the scanning of the ports of the server that hosts the website may be determined. If the ports of a server hosting a website have not been scanned within a maximum time of an invocation of a website selective scan, the server ports may be scheduled to be scanned contemporaneously with the invocation of the website selective scan. Generally, a hosting provider is the target for receiving a port scanning report; however, if a subscriber signs up for selective website scanning directly (e.g. not through an affiliation with a web hosting server) the owner of the server of the website may not be known so port scanning reports may be reported directly to the subscriber.

Portions of the selective website vulnerability and infection scanning and/or portions of the intelligent rigorous direct website testing may be implemented in various computer architectures. One such architecture is a pod-based massively sharded embodiment that may provide significant scalability. Such scalability may be useful and beneficial as the methods and systems described herein related to website selective security scanning and intelligently paced testing may require supporting millions of subscriber websites and tens of millions of web pages or more. A pod-based architecture may include one or more pods, each including sufficient processing power to handle up to a large number of subscribers. Each pod may include selective scanning servers, scheduling servers, direct website testing servers, databases (e.g. sharded databases), and the like. In an example, a pod may include three selective scanning servers (e.g. web and/or virtual servers, and the like), one scheduling server (e.g web server, virtual server, and the like), a rigorous direct website testing server, and a sharded database that may be managed by the scheduling server.

A scheduling server may facilitate access to a sharded database of subscriber website information including information that is captured through an invocation of a selective scanning process as described herein (e.g. website page map, page links, status of testing of pages and links, subscription level, and the like.) Data may be retrieved from the sharded database (e.g. by the scheduling server) and provided to a selective scanning server to commence an invocation of a selective scan of a website. Data may be delivered to the sharded database from a variety of sources, such as from a selective scanning server contemporaneously with an invocation of a website selective scanning process. The database maybe sharded to facilitate improved performance of various database functions (e.g. mysql functions, and the like), database backup, and the like. Support for the sharded database may be included in software functionality provided by the scheduling server, or any of the other servers in a given pod.

Database management of a pod may be organized such that new subscribers are allocated to an open shard (e.g. a shard that has not yet reached a target number of subscribers). Such an open shard may be an unused shard or a shard that has not yet been allocated to sufficient number of subscribers. This organization and assignment of new subscribers may result in predictable performance of each pod, controlled knowledge regarding need for increasing the number of pods in the architecture, and the like.

A selective scanning server, or any number of selective scanning servers may be configured in a pod to perform selective website vulnerability/infection/spam/malware scanning as described herein. Selective scanning servers perform all functions of scanning for a website or may share scanning functions so that each server may be optimized to perform similar scanning functions and a plurality of servers may perform a complete selective scan of a website. In an example, a first selective scanning server may spider a website and collect home page contents and links; a second selective scanning server may analyze binary website pages, javascript, flash and the like; a third selective scanning server may conduct link analysis and provide URLs to the first and/or second selective scanning server to retrieve and process pages accordingly. Other combinations of selective scanning server configurations, functionality, and operation are possible and are contemplated herein.

An intelligently paced rigorous direct web site testing server, or a plurality thereof may be configured in a pod to perform intelligently paced direct website testing of subscriber website pages, and the like. Third-party testing services may be employed in such an architecture to take advantage of current best practices for rigorous direct website testing within an intelligence-based pacing framework as described herein. Such third-party services may be licensed and executed on an intelligence-based pacing rigorous direct website testing server, or pacing intelligence may be integrated into such third-party services so that the services may be performed by third-party servers.

All servers in a pod may communicate through, or with the assistance of a scheduling server to access subscriber data, such as in a shard of the sharded database.

Figure 7:
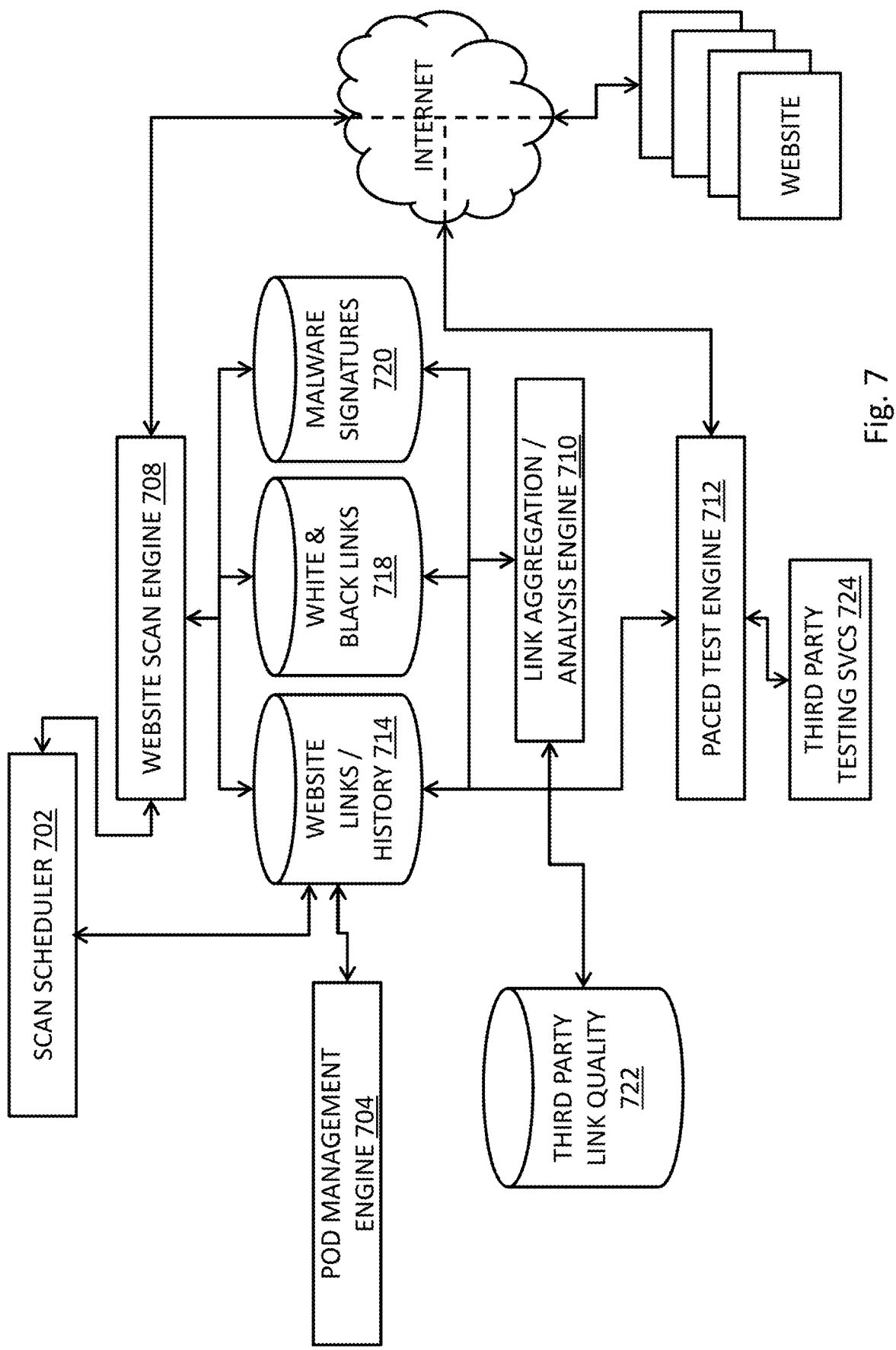
FIG. 7 depicts a block diagram of functional blocks of the methods and systems of website scanning and testing.

Referring to FIG. 7 which includes a depiction of a block diagram of functional blocks of the methods and systems of website scanning and testing as described herein, security system functionality may be exemplified. Functionally, a pod of the pod-based massively sharded architecture may include a scan scheduler 702 for determining a timing and an order of website scanning, a pod management engine 704 for managing new client allocation to the pod and/or to a shard in the database, a sharded database for storing subscriber website information 714, one or more website scan engines 708 for performing selective website vulnerability and infection scanning, white and black link lists 718 for determining the status of each link captured through the website scan engine 708, malware signatures 720 that may include malware signatures determined organically or through third-party link quality data 722, a link aggregation and analysis engine 710 for performing various link aggregation analysis and black/white list maintenance and the like, paced direct website testing engine 712 to implement the intelligently paced direct website testing as described herein, a third-party testing services for facilitating rigorous direct website testing, and the like.

Such functional blocks may be interconnected through direct and indirect connections (e.g. through the internet) with each other, with other pods, with third-party data sources, with subscriber websites, and the like.

Figure 8:
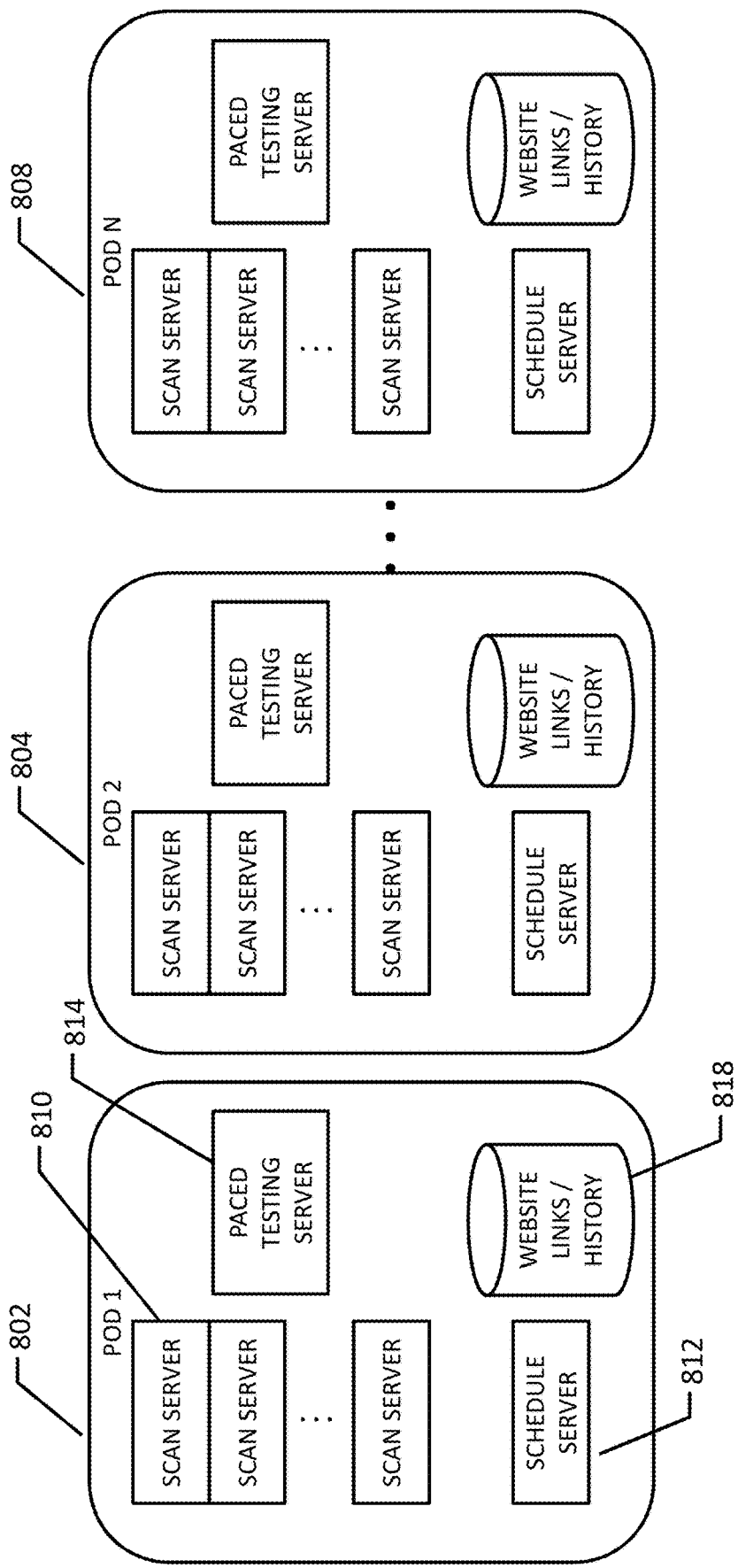
FIG. 8 depicts a plurality of website scanning and testing pods and basic structural elements of each such pod.

Referring to FIG. 8, which depicts a plurality of website scanning and testing pods, basic structural elements of each such pod are presented. As noted above, an embodiment of a scalable pod-based architecture that is massively sharded may include a plurality of similarly configured pods. Such an architecture as depicted in FIG. 8 may include a first pod 802, a second pod 804, and a third pod 808. Any number of pods may be included in the architecture and may be similarly configured and/or differently configured as best suits the needs of a deployment. Each pod (902, 804, and 808) in FIG. 8 are shown to have substantially identical elements for simplification of explanation; however as noted herein elements maybe different in each pod. The description of the first pod 802 may thus be applied to each of the other pods in FIG. 8. Each pod may include a plurality of scan servers 810, one or more schedule servers 812, on or more paced testing servers 814, and one or more datasets 818 that may contain subscriber data, link aggregation results, black/white lists, malware signatures, scheduling data, and any other data that may be necessary or beneficial to perform the methods described herein.

A low cost, efficient, and effective selective website vulnerability and infection testing service may be offered directly to subscribers through various websites, affiliate sites, partners, and the like. Identifying and capitalizing on the various subscriber signup channels may take advanced software and interfacing capabilities. One partner environment that may provide significant advantages for accessing potential subscribers is a shared web hosting environment. Partners who may offer embodiments of the testing services described herein to current and/or new subscribers, or who may include such services a part of a web hosting promotion to potential web hosting clients, and the like (e.g. at a discount off of retail pricing) may provide ready access to a large number of potential website security testing subscribers. Therefore, making the interface between a shared web hosting system and a system that facilitates the selective website vulnerability and infection testing services efficient and effective for the shared web hosting subscribers may have significant advantages in signing up subscribers. Shared web hosting providers have access to millions of current website owners, millions of potential subscribers, and tens or hundreds of thousands of new web hosting subscribers who sign up for web hosting services. Therefore a software compatible interface, such as an API may be developed and/or adapted for each type or provider of shared web hosting services to take advantage of this large number of potential website testing subscribers.

As an adjunct to selective website vulnerability and infection scanning and intelligently paced rigorous direct website testing, the methods and systems of website security described herein may include verification of a business associated with a subscriber website. Business verification may benefit a subscriber website in that a marker may be placed on a website so that it is visible to website visitors. Various levels of business verification may be provided and may include any of verification of a phone number, domain ownership and a physical address to facilitate verifying the elements of a business's legitimacy. While a marker may be present on a website when a business has completed at least a portion of business verification, only those business aspects that have been verified may be accessible when a website visitor selects the business verification marker. Additionally, subscribers may also select what type of verification data is presented when a visitor selects the business verification marker. In addition, information that has been verified can be provided to the website visitor by accessing the marker (e.g. the phone, contact email, and/or physical address).

Business verification may include phone contact verification that may include placing a call to a number provided by the subscriber to ensure that website visitors can reach the business associated with the website. Verification may be completed by a person receiving the call by entering a phone confirmation code provided in the call into a verification field of a dashboard.

Business verification may include physical address verification that may include sending a letter with the confirmation code that can be entered into the dashboard verification field.

Domain ownership, which may be validation of receiving email at the domain may include sending an email to an address provided by the subscriber that is associated with the domain of the website to be scanned. Generic domains (e.g. GMAIL.COM, HOTMAIL.COM, and the like) may not be valid email addresses for verifying domain ownership. A user who receives the verification email at the email address associated with the website domain may enter a confirmation code from the email into a verification dashboard.

Figure 9:
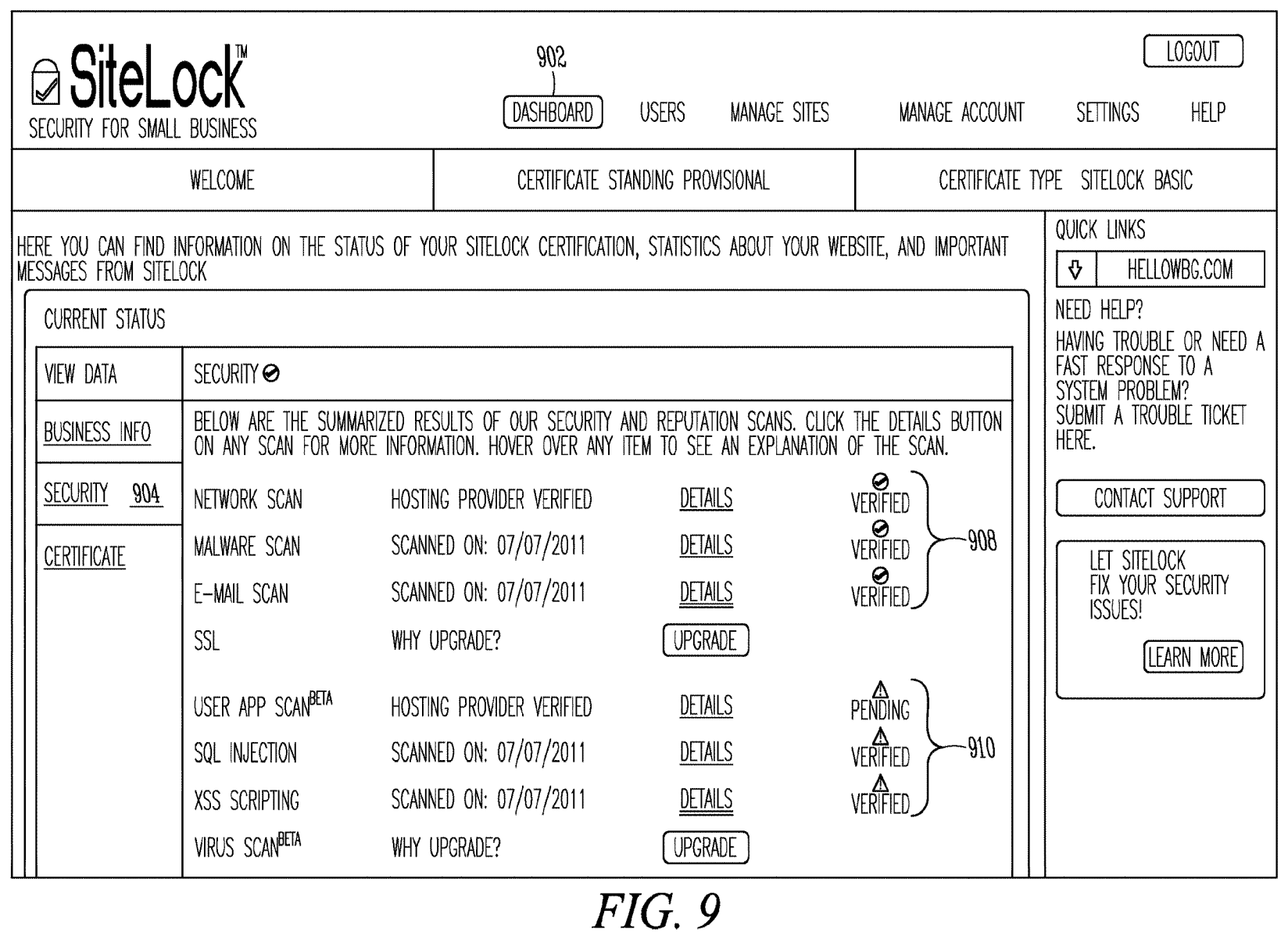

The methods and systems described herein may be accessed, monitored, controlled, and otherwise provide information to a subscriber through a dashboard. There may be a variety of dashboard screens, content, alerts, actions, and the like associated with such dashboard(s). FIG. 9 illustrates a snapshot of a dashboard 902 of a website's scanning service, in accordance with an embodiment of the present invention. The dashboard 902 may include a security service 904 for providing the current status of various security and reputation scans. Further, the security service 904 may be connected to a network and may provide the current status of the security and reputation scans to a user via the network. The current status may include, but is not limited to, a visual indication about the status of the security and reputation scans such as Network Scan, Malware Scan, Email Scan, SSL, User Apps Scan, SQL Injections, XSS Scripting, Virus Scan, and the like. For example, visual indication 908 is provided when scans such as the Network Scan, the Malware Scan, and the E-mail Scan have verified a hosting provider. The current status may also provide the date on which the scans were last conducted.

In another example, visual indication 910 may correspond to a pending scan such as the User Apps Scan, SQL Injection Scan, and XSS Scripting Scan. The pending status may indicate that such scans can only be run for 80 days from sign up and therefore, their verification may be pending. In embodiments, the security service 904 may also provide information that may be helpful to the users. The information may include, but is not limited to, upgrade alerts for any of the scans, reasons for requiring upgraded scans, and details about the scans.

Further, the dashboard 902 may provide the current information about a security certificate for a company website. For example, if security issues are detected on the company website and they are not resolved for a few days, the website scanning service may suspend the security certificate provided to the company. Once the issues are resolved, the security certificate may be provided back. Accordingly, the users may check the current status of the security certificate any time. In embodiments, the dashboard 902 may provide the current status of a company business. For example, the dashboard 902 may enable a user to view statistical information such as sales summary, key trends, comparisons, and other information related to the company's business.

Figure 10:
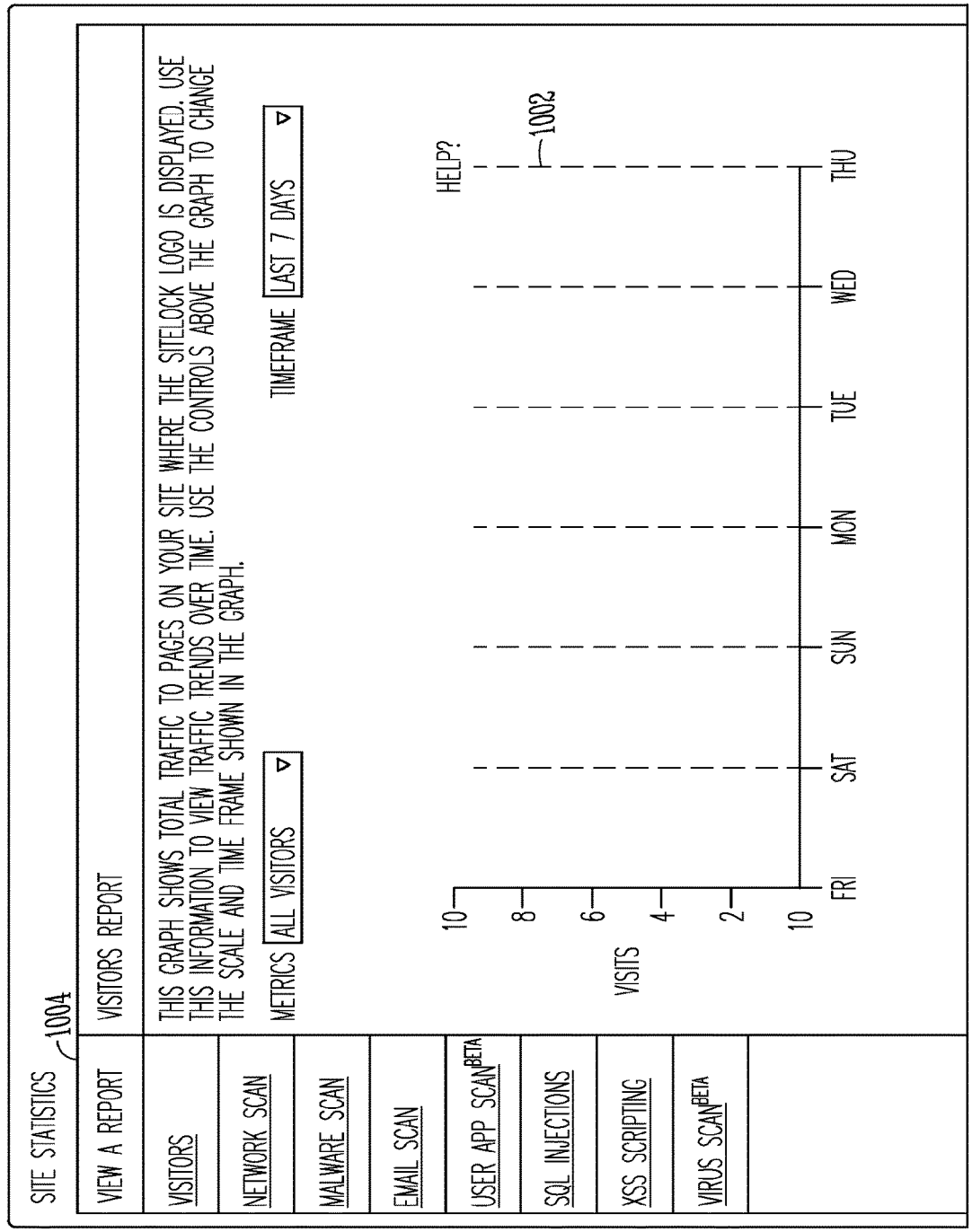
FIG. 10 depicts a snapshot of a graph representing total traffic to web pages of a web site.

FIG. 10 illustrates a snapshot of a graph 1002 representing total traffic to web pages of a website, in accordance with an embodiment of the present invention. The traffic information may be provided for each day of the week as shown in the FIG. 10. The website scanning service may enable the user to view statistical data for a plurality of fields 1004. The plurality of fields may include but are not limited to, visitors, network scan, malware scan, email scan, user apps scan, SQL injections, XSS scripting, and virus scan. For example, the user may get traffic trends based on the number of visitors over a period of time. The user may also check the statistical data for the network scan to check the number of times the website scanning service has run a network scan in the last 15 days on their website.

In embodiments, these statistics may be displayed as a detailed graphical view of activities happening on the websites. Each statistics may be customizable to enable the user to change the parameters of the graphical representation. For example, the user may view statistical information about the total number of visitors by selecting the time frame for which the user may like to see the information. The website scanning service may enable the user to select categories of visitors who accessed the web pages of the website. Further, the dashboard 902 may include an alerts and messages portions to update the users regarding the security and reputation of their business.

In embodiments, the website scanning service may focus on security aspects of a website. For example, the website scanning service may detect malware and may also scan external websites for malware infection and threats.

FIG. 11 illustrates a snapshot displaying messages and alerts section 1102 from the website(s) scanning service regarding the security issues is illustrated, in accordance with an embodiment of the present invention. The website scanning service may provide alerts and messages in real-time and asynchronously in response to a change in the security status of a web page. The alerts and messages provided by the website scanning service may provide details about the date on which the message/alert has been generated, type of messages sent to the users, severity of the messages, subjects of the message, and the like. In embodiments, the messages and alerts may be provided in detail to users along with the link to support services provided by the website scanning service.

Figure 12:
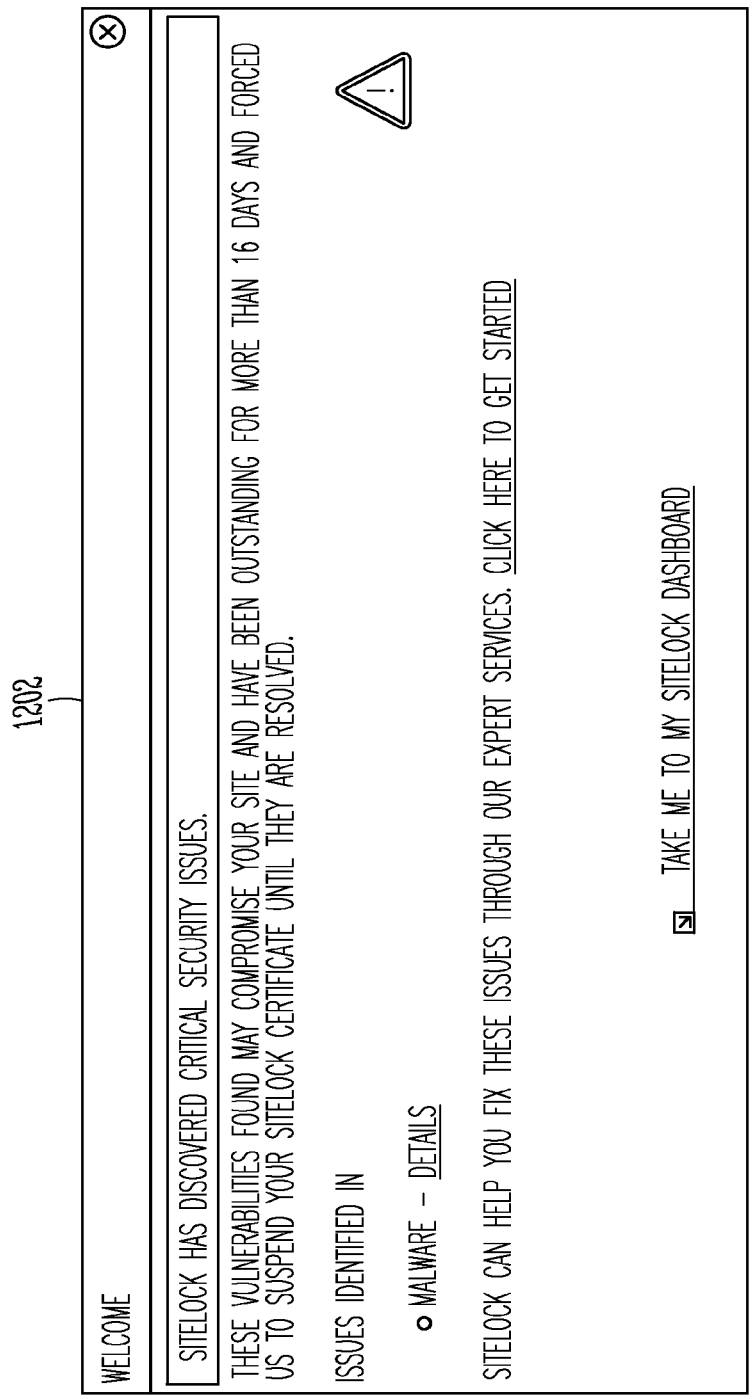
FIG. 12 depicts a screen shot of the website scanning service showing detection of a security issue.

FIG. 12 illustrates a screen shot of the website scanning system showing detection of a security issue is illustrated, in accordance with an embodiment of the present invention. The security issue may be related to detection of a malware in the web pages of a website. The website scanning service may provide automatic alerts indicating presence of the malware. These alerts may be sent to a user through e-mails or such alerts may appear as a pop-up when the user may access the website. In an embodiment, the website scanning service may also determine the presence of malware in outbound links that may be associated with the website. Further, the website scanning service may provide an in-depth reporting for effective rectification of identified malware. Such reporting may help users to protect their websites as well as may offer protection of website visitors from malware. As shown in the FIG. 12, the screen shot may also provide details about the detected malware.

The website scanning service may also issue security certificates to other websites to assure visitors about the safety and security of the website they are accessing. In an exemplary embodiment, if the website scanning system identifies any vulnerability in the website, it may provide an alert to the user. Further, if the vulnerability is not addressed for some time, the website scanning system may suspend the security certificate until the vulnerability has been resolved. Additionally, the website scanning service may facilitate in remediation of the detected malware. In an embodiment, the website scanning service may provide links that may enable users to connect to experts for eradicating malware from their websites.

Figure 13:
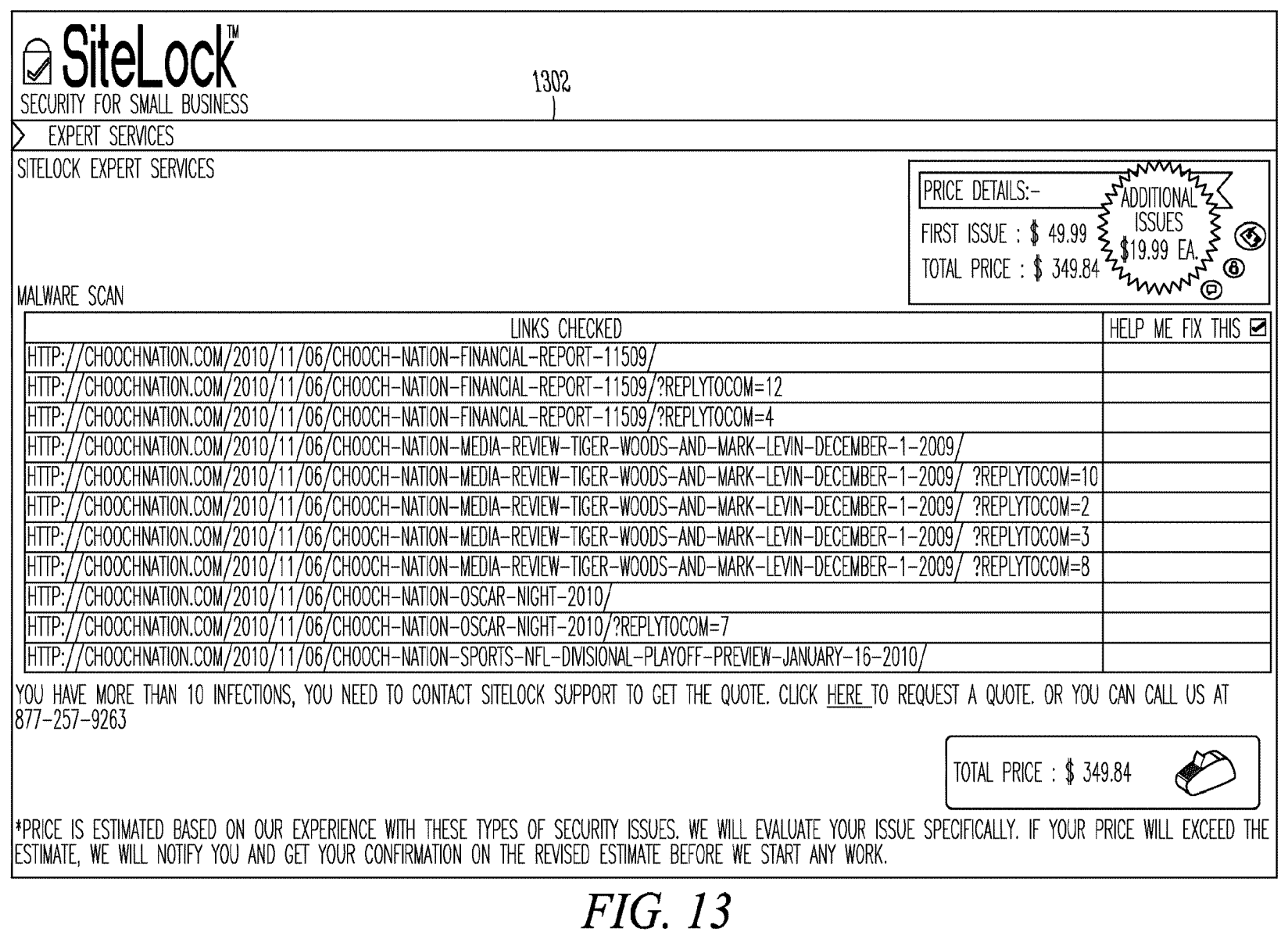

FIG. 13 illustrates a screen shot of the website scanning service for selecting the issues related to malware for which users are seeking expert services 1302, in accordance with an embodiment of the present invention. The website scanning system may provide support of security experts in resolving the issues. As described in FIG. 12, the website scanning service may identify the presence of vulnerabilities on a website and may generate alerts accordingly. The website scanning service may provide a list of all the vulnerabilities that may be identified while running a malware scan on the website. The user may then be prompted to select the vulnerabilities that may need help from the security experts of the website scanning service.

In an embodiment, the website scanning service may ask the user to pay a fee amount for using the expert services. Once the user pays the required amount, the security experts from the website scanning service may conduct research about the vulnerabilities and may fix them. In an exemplary embodiment, the website scanning service may scan for cross-scripting vulnerabilities and may correct them. Further, the website scanning service may generate reports for the users. These reports are explained in detail in conjunction with FIGS. 14 and 15.

Figure 14:
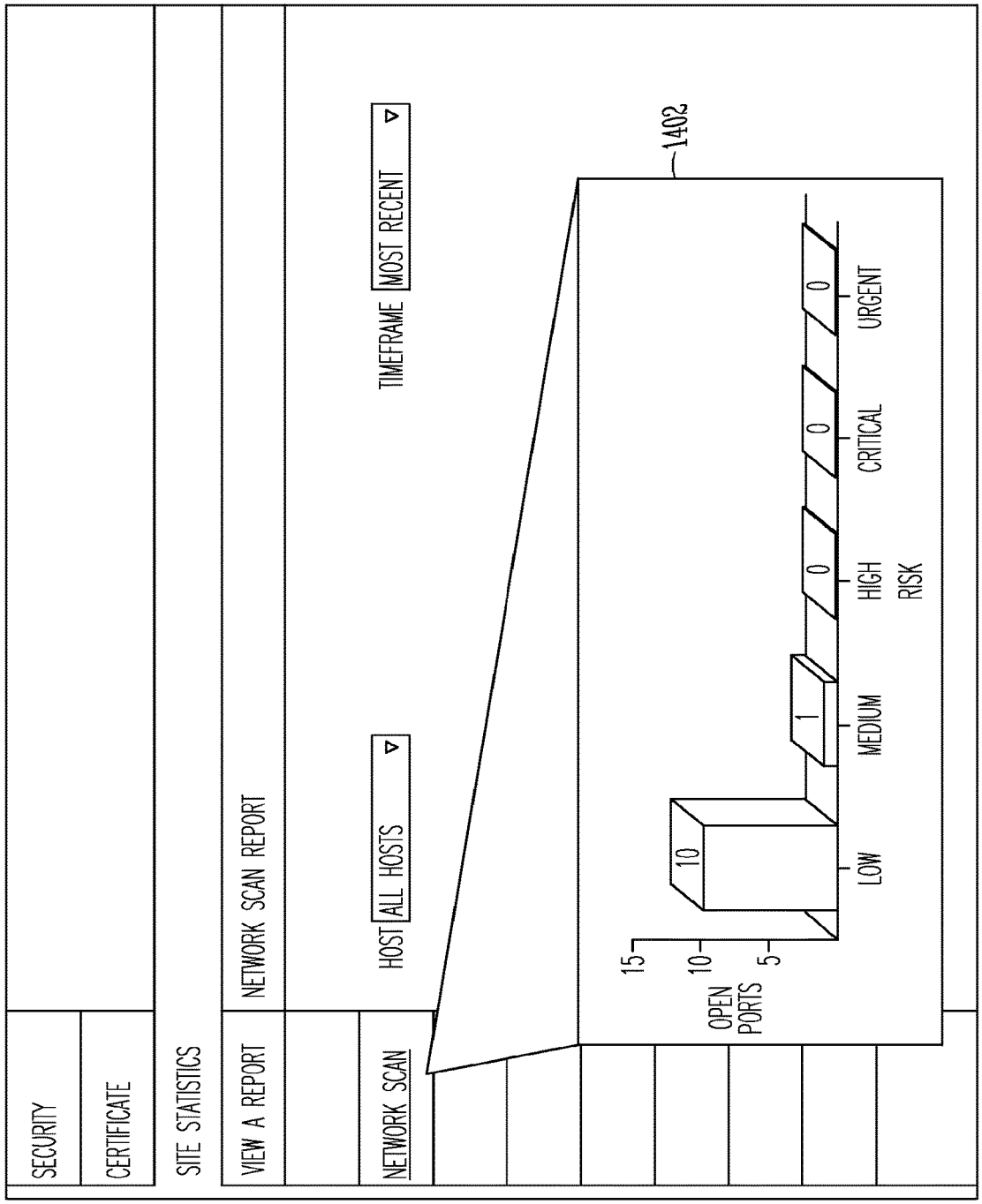
FIG. 14 depicts a screen shot of a network scan pop-out report.

FIG. 14 illustrates a screen shot of a network scan pop-out report 1402, in accordance with an embodiment of the present invention. The website scanning service may provide statistical data about various scans taking place at the network. Further, the website scanning service may conduct a port scanning to probe a website server for open ports. Such open ports may be easy targets by hackers, thereby leading to exploitation of potential vulnerabilities in any website. In an embodiment, the network scan of the website scanning service may take place every day and if the scanning service comes across any vulnerability, it may send the report 1402 to the user.

Further, the report 1402 may provide a graphical representation of the open ports of the website to indicate each level of malware severity. For example, the report 1402 may indicate the ports that may be vulnerable to security threats such as hacking, identity thefts, scams, and the like. These ports may be arranged in such a manner so as to indicate the users about the severity of risk associated with these ports. Accordingly, these reports may facilitate a user to identify the ports that may be at high risk and may need urgent attention. The user may also take help from the website scanning service support team.

Figure 15:
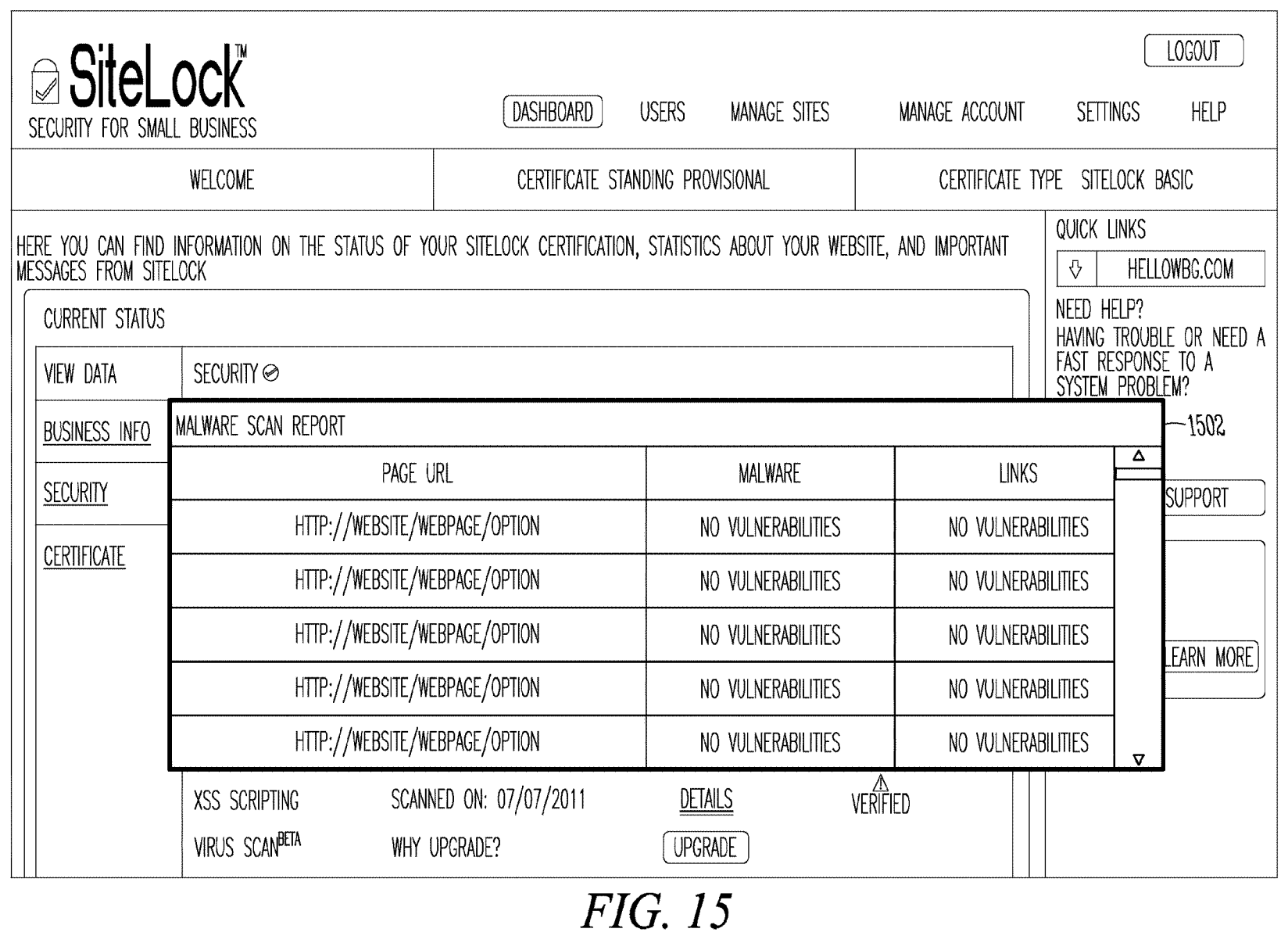

FIG. 15 illustrates a screen shot of a malware scan pop-out report 1502, in accordance with an embodiment of the present invention. The report 1502 may provide a list of web pages that may be scanned by the website scanning service. These web pages may include URL for each page, malware found in the web page, and the like. The report 1502 may also provide the status of the links that may be found on the scanned web pages. For example, the report 1502 may indicate the presence or absence of vulnerabilities on the website.

The methods and systems described herein may be deployed in part or in whole through a machine that executes computer software, program codes, and/or instructions on a processor. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipments, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference.

The invention claimed is:

1. A method of selective website page vulnerability and infection testing, comprising:
    identifying, based on a profile of a subscriber to a hosting plan for a website, a window in which selective vulnerability and infection testing in an invocation instance of the website is to be performed;
    upon determining that the window for selective vulnerability and infection testing is open, distributing the testing over a period of discrete time frames to reduce testing bandwidth consumption by, for each time frame:
        determining a maximum permissible number of website pages of a website to test for vulnerabilities and infection by analyzing the profile, wherein the profile includes the maximum permissible number of pages in the website to test;
        determining a first subset of pages of the website to test based on the determined maximum permissible number, wherein a count of pages in the first subset of pages is less than the maximum permissible number of pages of the website to test;
        selecting a second subset of pages of the website from the first subset based on a page-test-maximum threshold parameter of the website hosting subscriber profile wherein the page-test-maximum threshold is a minimum permissible number of pages of the website to test; and
        applying selective vulnerability and infection testing in the invocation instance of website testing to a portion of the second subset.

2. The method of claim 1, wherein the page-test-maximum threshold parameter value applies to a single invocation of infection and vulnerability testing of the website.

3. The method of claim 1, wherein the page-test-maximum threshold value limits the number of website pages being tested independent of a count of invocations of infection and vulnerability testing of the website.

4. The method of claim 1, wherein the second subset of pages of the website selected is based on analysis of links in pages in the first subset of pages of the website.

5. The method of claim 4, wherein the analysis of links includes at least one of an infection status of a webpage that may be identified by a link, an analysis of historical data of the link, a length of URL associated with the link, similarity of the links, and a location of a link on the website page.

6. The method of claim 1, wherein the second subset of pages is further limited based on a hosting architecture of a host system hosting the website.

7. The method of claim 1, wherein the second subset of pages is further limited only for websites that are commonly hosted with other websites.

8. The method of claim 1, further comprising configuring a pacing of the selective website vulnerability and infection testing based on the maximum permissible number of website pages allowed for testing.

9. The method of claim 1, wherein the second subset of website pages is based on a links per page limit specified in the subscriber profile.

10. The method of claim 1, wherein the second subset of website pages is further limited by a client direction.

11. The method of claim 10, wherein the number of website pages in the second subset is increased with each scan invocation based on the client direction.

12. A system for selective website page vulnerability and infection testing, comprising:
a processor; and
a memory having programming instructions stored thereon, which, when executed by the processor, performs one or more operations comprising:
identifying, based on a profile of a subscriber to a hosting plan for a website, a window in which selective vulnerability and infection testing in an invocation instance of the website is to be performed; and
upon determining that the window for selective vulnerability and infection testing is open, distributing the testing over a period of discrete time frames to reduce testing bandwidth consumption by, for each time frame:
determining a maximum permissible number of website pages of a website to test for vulnerabilities and infection that is determined by analyzing the profile of the subscriber, wherein the profile includes a maximum permissible number of pages in the website;
determining a first subset of pages of the website to test based on the determined maximum permissible number, wherein a count of pages in the first subset of pages is less than the maximum permissible number of pages of the website to test;
selecting a second subset of pages of the website on a page-test-maximum threshold parameter of the website hosting subscriber profile, wherein the page-test-maximum threshold is a minimum permissible number of pages of the website to test; and
applying selective vulnerability and infection testing in the invocation instance of website testing to a portion of the subset based.

13. The system of claim 12, wherein the system further comprises a sharded database that stores subscriber website testing information, including a description of the subset of website pages to test.

14. The system of claim 12, wherein the second subset of website pages is substantially fewer than the maximum permissible number of pages to be scanned.

15. The system of claim 12, wherein the page-test-maximum threshold parameter value applies to a single invocation of infection and vulnerability testing of the website.

16. The system of claim 12, wherein the page-test-maximum threshold value limits the number of website pages being tested independent of a count of invocations of infection and vulnerability testing of the website.

17. The system of claim 12, wherein the second subset of pages of the website selected is based on analysis of links in pages of the website.

18. The system of claim 17, wherein the analysis of links includes at least one of an infection status of a webpage that may be identified by a link, an analysis of historical data of the link, a length of URL associated with the link, similarity of the links, and a location of a link on the website page.

19. The system of claim 12, wherein the second subset of pages is further limited based on a hosting architecture of a host system hosting the website.

20. The system of claim 12, wherein the second subset of pages is further limited only for websites that are commonly hosted with other websites.

21. The system of claim 12, further comprising configuring a pacing of the selective website vulnerability and infection testing based on the maximum permissible number of website pages allowed for testing.

22. The system of claim 12, wherein the second subset of website pages is based on a links per page limit specified in the subscriber profile.

23. The system of claim 12, wherein the second subset of website pages is further limited by a client direction.

24. The system of claim 23, wherein the number of website pages in the second subset is increased with each scan invocation based on the client direction.

* * * * *